(12) United States Patent (10) Patent No.: US 11,651,253 B2
Choudhary et al. (45) Date of Patent: May 16, 2023

(54) MACHINE LEARNING CLASSIFIER FOR IDENTIFYING INTERNET SERVICE PROVIDERS FROM WEBSITE TRACKING

(71) Applicant: THE DUN & BRADSTREET CORPORATION, Short Hills, NJ (US)

(72) Inventors: Lavina Choudhary, Weehawken, NJ (US); James Beveridge, Brooklyn, NY (US); Alexander T. Schwarm, Austin, TX (US); Anudit Vikram, Kew Gardens, NY (US)

(73) Assignee: THE DUN AND BRADSTREET CORPORATION, Short Hills, NJ (US)

( * ) Notice: Subject to any disclaimer, the term of this patent is extended or adjusted under 35 U.S.C. 154(b) by 0 days.

(21) Appl. No.: 16/857,748

(22) Filed: Apr. 24, 2020

(65) Prior Publication Data

US 2020/0342337 A1 Oct. 29, 2020

Related U.S. Application Data

(60) Provisional application No. 62/838,782, filed on Apr. 25, 2019.

(51) Int. Cl.
*G06N 5/04* (2023.01)
*G06N 20/00* (2019.01)

(52) U.S. Cl.
CPC .............. *G06N 5/04* (2013.01); *G06N 20/00* (2019.01)

(58) Field of Classification Search
CPC ...... G06N 5/04; G06N 20/00; H04L 61/2007; G06Q 30/0201; G06Q 10/105; G06F 16/958
See application file for complete search history.

(56) References Cited

U.S. PATENT DOCUMENTS

| 6,148,289 | A  | * | 11/2000 | Virdy ..................... G06Q 30/02 |
| | | | | 705/1.1 |
| 7,620,655 | B2 | | 11/2009 | Larsson et al. |
| 7,822,757 | B2 | | 10/2010 | Stoker et al. |
| 7,937,336 | B1 | | 5/2011 | Maynard-Zhang et al. |
| 8,244,752 | B2 | | 8/2012 | Buehrer et al. |
| 8,346,790 | B2 | | 1/2013 | Stoker et al. |
| 9,679,259 | B1 | * | 6/2017 | Frind ..................... G06N 5/022 |

(Continued)

OTHER PUBLICATIONS

Nguyen, Thuy. A Survey of Techniques for Internet Traffic Classification using Machine Learning. Centre for Advanced Internet Architectures. Swinburne University Of Technology. IEEE Communications Surveys and Tutorials, 4th Edition 2008. Dec. 16, 2020. (Year: 2008).*

(Continued)

*Primary Examiner* — Andrew B Whitaker
*Assistant Examiner* — Shaun D Sensenig
(74) *Attorney, Agent, or Firm* — Ohlandt, Greeley, Ruggiero and Perle, LLP

(57) ABSTRACT

A method and system for identifying and classifying Visitor Information tracked on websites to identify Internet Service Providers (ISPs) and non-Internet Service Providers (non-ISPs). The technology employs machine intelligence to train a classifier on firmographically-enriched Visitor Intelligence from website tracking technology. The ISP classifier can distinguish ISPs from non-ISPs to identify website traffic for a given website that is attributable to ISPs.

21 Claims, 11 Drawing Sheets

(56) References Cited

U.S. PATENT DOCUMENTS

| | | | | |
|---|---|---|---|---|
| 9,697,248 B1* | 7/2017 | Ahire | ............... | G06N 5/025 |
| 2004/0225687 A1* | 11/2004 | Larsson | ............ | G06Q 30/00 |
| 2007/0266149 A1* | 11/2007 | Cobb | ............ | H04L 41/5009 |
| | | | | 709/224 |
| 2009/0172035 A1* | 7/2009 | Lessing | ............ | G06Q 30/02 |
| 2015/0106078 A1* | 4/2015 | Chang | ............ | G06F 16/35 |
| | | | | 704/9 |
| 2018/0041469 A1* | 2/2018 | Ishikawa | ......... | H04L 41/0686 |

OTHER PUBLICATIONS

International Search Report dated Jul. 14, 2020 in corresponding International PCT Patent Application PCT/US2020/029791, 3 pages.
Written Opinion dated Jul. 14, 2020 in corresponding International PCT Patent Application PCT/US2020/029791, 5 pages.
International Preliminary Report on Patentability dated Nov. 4, 2021 in corresponding PCT International Patent Application PCT/US2020/029791, 7 pgs.

* cited by examiner

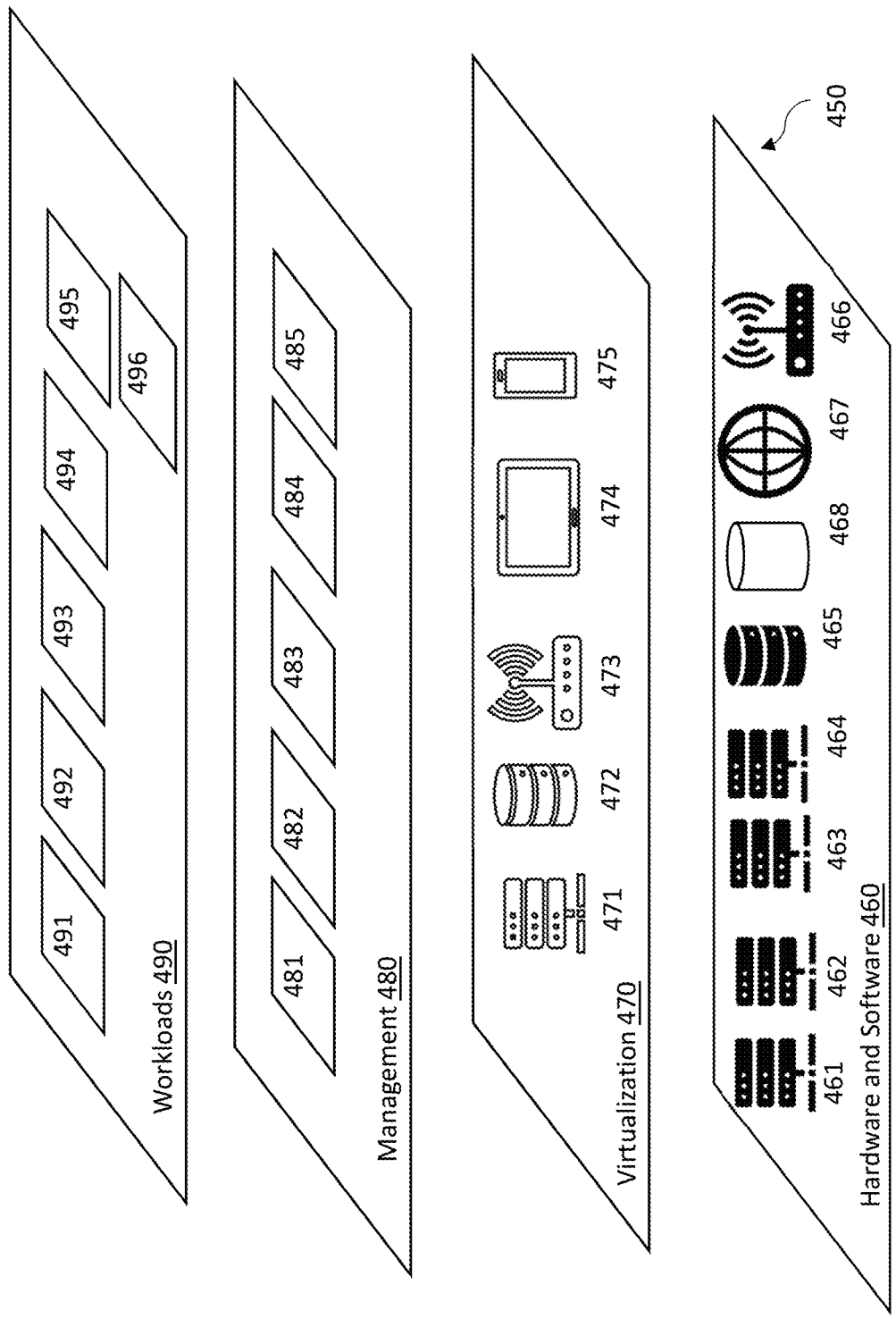

MACHINE LEARNING CLASSIFIER FOR IDENTIFYING INTERNET SERVICE PROVIDERS FROM WEBSITE TRACKING

CROSS-REFERENCE TO RELATED APPLICATION

The present application claims priority to U.S. Provisional Patent Application 62/838,782, filed on Apr. 25, 2019, the entirety of which is incorporated by reference hereby.

BACKGROUND OF THE DISCLOSURE

1. Field of the Disclosure

The present disclosure relates to a system and a method for Business Intelligence, Customer Relationship Management (CRM) Systems, Marketing Automation Platforms, and Web Analysis Systems.

2. Description of the Related Art

Current systems for web traffic, for example as used by CRM Systems, Business Intelligence, and Web Analysis Systems, want for solutions to distinguish the types of traffic on websites, for example, human traffic from non-human traffic.

SUMMARY OF THE DISCLOSURE

It is desirable to be able to accurately identify whether traffic from visitor client computer activity on a website are Internet Service Providers (ISPs) or non-ISPs. Methods and systems that typically rely upon simple lists of known ISPs or high-profile businesses (e.g. Fortune 500) can be technically deficient in identification of identifying client computer web traffic. These methods produce many false positives (incorrectly flagged ISPs) and false negatives (incorrectly flagged non-ISPs). They also do not leverage real, tracked web traffic data on websites from Visitor Intelligence (VI). These other methods also cannot identify Global Traffic with a native company name. Embodiments as described herein use VI and machine intelligence to determine whether a tracked entity is an ISP in the context of VI.

The following briefly describes a basic understanding of some aspects of the embodiments. Its purpose is merely to present some concepts in a simplified form as a prelude to the more detailed description that is presented later.

Described herein are embodiments of a computer system, method, and computer program products for using machine intelligence.

The arrangement of databases, mapping, and classifiers provide an improved prospect targeting platform that includes the following, non-limiting advantages over current Customer Relationship Management (CRM) systems.

In the following embodiments, described are systems and processes therefor configured to perform analysis for identifying ISP traffic on websites.

Accordingly, in an embodiment, described herein is a method, and computer system and computer program product for the method being performed by a computer system that comprises one or more processors and a computer-readable storage medium encoded with instructions executable by at least one of the processors and operatively coupled to at least one of the processors, the method comprising:

obtaining website data traffic content including IP address data for a website;

mapping the IP address data to a business entity identifier to identify a business entity associated with the website data traffic data;

obtaining attribute data for each business entity associated with the business entity identifier to identify business attributes associated with the business entities mapped to the IP address data;

generating a training data set from the website data traffic content and the attribute data for training an Internet Service Provider (ISP) classifier to identify ISPs associated with the mapped web traffic data;

applying the ISP classifier to a database of website tracking data; and identifying website traffic for the website attributable to ISPs.

In an embodiment, the method comprises:

obtaining a match acceptance rate of IP addresses from the website traffic data mapped to business entities identifiers; and generating the training data set from the IP addresses from the website traffic data matched to the business entities identifiers.

In an embodiment, the method comprises: replacing the IP addresses from the website traffic data mapped to the business entities identifiers with previously identified IP addresses from the website traffic data that were previously mapped or matched to other business entities.

In an embodiment, the method comprises: generating a model for training the ISP classifier; training the model on the training data set; determining if the trained model accurately identifies ISPs; and if the model is accurate, applying the trained model as the ISP classifier.

In an embodiment, the method comprises: obtaining website data traffic content including IP address data for a website further comprising: placing a tracking code object on a website to be tracked; and generating a log file identifying all IPs and cookies associated with the IPs tracked by the tracking code.

In an embodiment, the web traffic data comprises, per IP address, a count of visits, unique visitors, and index customer count that accessed the website within a time window. The time window can comprise: a time window selected from the group consisting of: a weekly time interval, a bi-weekly interval, a monthly interval, a bi-monthly interval, and a quarterly interval. The attribute data for each business entity associated with the business entity identifier can comprise firmographic data. Firmographic attribute data can include annual sales, an industry code, and employee count. The industry code comprises an SIC code, an NAICS code, or both. A feature set for the classifier model can comprise features from the firmographic data for the attribute data and the web traffic data comprising: NAICS, SIC, unique visitors, visit count, employee count, annual sales, and index customer count.

The classifier model can comprise a model selected from the group consisting of a decision tree or a gradient boosting classifier. The gradient boosting classifier training can comprise iterating the gradient booster classifier for about 1000 iterations.

Accordingly, embodiments as described herein provide a technology solution that improves over conventional CRM Systems, Business Intelligence Systems, and Web Analysis Systems, which rely on subjective human judgement and less robust rules-based machine identification.

Exemplary advantages of embodiments as described herein include a framework that runs periodically (e.g.: every month) and uses the latest web traffic to re-classify ISPs. Embodiments of the system enhance the credibility of VI by providing defensible probabilities around an ISP classification. The system also uses an automated approach to apply machine learning to classify huge datasets by incorporating various target attributes and features.

The system as described herein provides distinct technological advances over other systems and methods for web traffic ISP identification. Alternate methods typically rely upon simple lists of known ISPs or high-profile businesses (e.g. Fortune 500). These methods produce many incorrectly flagged non-ISPs. They also fail to generalize to the long tail of identified businesses. Also, they do not leverage the behavior of real web traffic data tracked on the website. The present embodiments track the behavior of traffic on the website itself and use this activity as a signal in determining whether an entity associated with the web traffic should be considered an ISP in the context of Visitor Intelligence.

BRIEF DESCRIPTION OF THE DRAWINGS

Embodiments will now be further described, by way of example only, with reference to the accompanying drawings.

FIGS. 4A-4E shows an embodiment of an environment in which the present embodiments can be practiced.

DETAILED DESCRIPTION OF THE EMBODIMENTS

Various embodiments now will be described more fully hereinafter with reference to the accompanying drawings, which form a part hereof, and which show, by way of illustration, specific embodiments by which the disclosure may be practiced. The embodiments can, however, be embodied in many different forms and should not be construed as limited to the embodiments set forth herein. Rather, these embodiments are provided so that this disclosure will be thorough and complete, and will fully convey the scope of the embodiments to those skilled in the art. Among other things, the various embodiments can be methods, systems, media, or devices. The following detailed description is, therefore, not to be construed in a limiting sense.

Throughout the specification and claims, the following terms take the meanings explicitly associated herein, unless the context clearly dictates otherwise. The term "herein" refers to the specification, claims, and drawings associated with the current application. The phrase "in embodiments" or "in embodiments" as used herein does not necessarily refer to the same embodiment, though it may. As described below, various embodiments of the present disclosure can be readily combined, without departing from the scope or spirit of the present disclosure.

In addition, as used herein, the term "or" is inclusive, and is equivalent to the term "and/or," unless the context clearly dictates otherwise. In addition, throughout the specification, the meaning of "a" "an" and "the" include plural references. The meaning of "in" includes "in" and "on".

Figure 1:
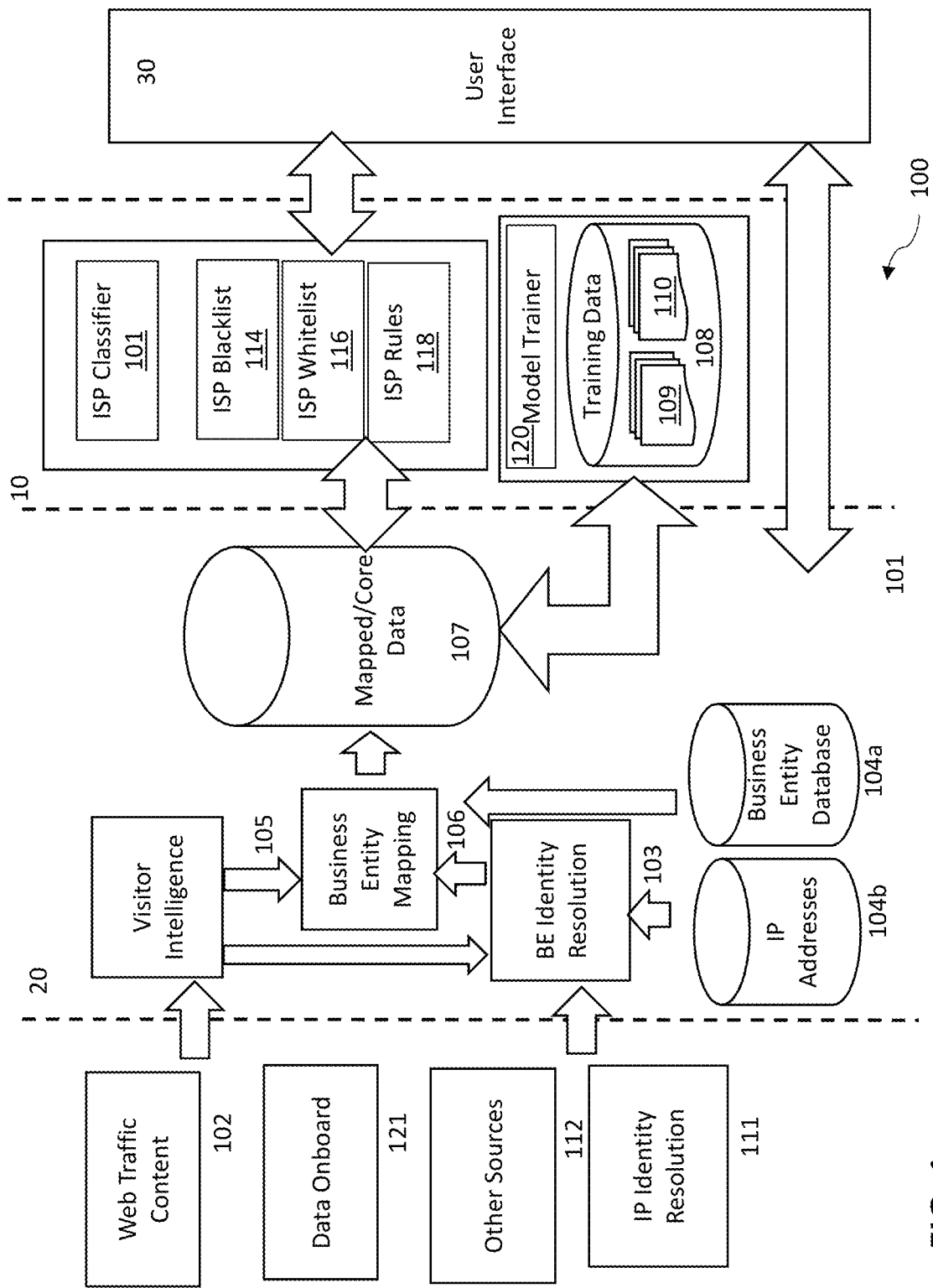
FIG. 1 is a block diagram of logical architectures for an embodiment.
Figure 2:
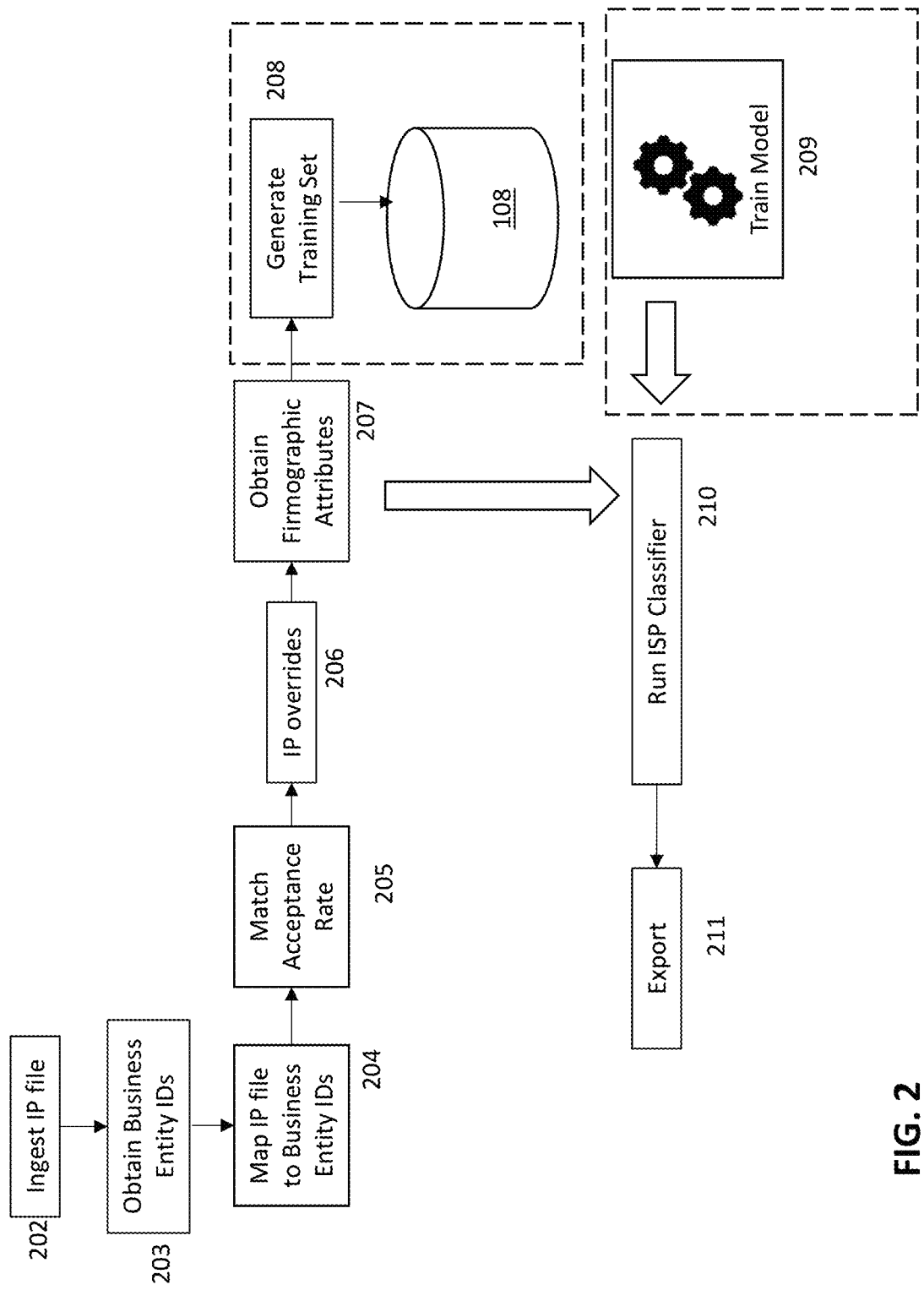
FIG. 2 is a diagram of a flow chart showing a process in accord with an embodiment.

Referring to FIG. 1, the system is generally represented by reference numeral 100 and illustrates a block diagram of logical architectures and modules for an embodiment. FIG. 2 is a flow chart showing a process in accordance with the embodiment. At block 202, the system is configured to ingest a set of web data traffic content 102 for websites. The web data content can be the web page content being accessed (e.g., a product page, any web page from a site), IP addresses, mobile IDs, and web browser cookies. For example, in an embodiment, the system can be configured to include or interface with an identity resolution and/or data onboarding platform 121. For example, the system could perform identity resolution or interface with platforms 111, 112, 102, 121 (for example, platforms such as Digital Element™ LiveRamp™, Neustar™, Acxiom™, etc.) to access and onboard web data traffic content 102 or perform or obtain identity resolution data for business entities associated with an IP address. Identity resolution can be done using IP Identity Resolution technology platforms 111 and tools as known in the art, for example, by matching cookie data to IP addresses, synching cookie pools, etc.

In an embodiment, a tracking code object is placed on a website to be tracked. For example, a tracking pixel or JavaScript tracking code can be placed on the web server. The following data can be acquired and analyzed with a tracking pixel:

Operating system used (gives information on the use of mobile devices);
Type of website or email used, for example on mobile or desktop;
Type of client used, for example a browser or mail program;
Client's screen resolution;
Time an email was read, or website was visited;
Activities on the website during a session (using multiple tracking pixels);
IP address (gives information on the Internet Service Provider and location);
A log file identifying all IPs and cookies associated with the IPs tracked by the tracking code.

Accordingly, in an embodiment, the system is configured to obtain visitor intelligence (VI) data 105, such as a digital element file, web scraper data, or other onboarding tools. The system is configured to aggregate web traffic data consisting of, inter alia, count of visits, unique visitors and customer-indexed attributes per IP address accessing content on a website. As described herein, this data can be collected to cover a given time window (e.g.: a weekly time interval, a bi-weekly interval, a monthly interval, a bi-monthly interval, and/or a quarterly interval). In an embodiment, the VI 105 web traffic data for a multiplicity of websites can be rolled up for aggregate tracking and machine intelligence training.

At block 203 the system is configured to obtain business entity identifications from a business entity firmographic database 104a. At block 204 the business entity mapping module 106 is configured to map the web traffic data content 102. At block 204, the system is configured to map the web data traffic content 102 to a business entity identifier to identify a business entity visiting each website.

At block 204, a business entity platform 20 server can comprise a business entity identity resolution module 103 that matches each of the web traffic IP addresses with a business identification number, for example, a DUNS number (hereinafter referred to simply as "DUNS"), from a business entity information database 104a. At block 205, the system can be configured to determine a match rate for IP addresses successfully matched to a business identifier. Initial mapping in a robust business information database can be, for example, at a 10-20% percent match rate (e.g. 15%). At block 206, the system can be configured to override IP address-to-business identifier matches, for example, by replacing or remapping the IP addresses from the website traffic data mapped to the business entities identifiers to previously identified IP addresses from the website traffic data that were mapped or matched to other business entities.

In an embodiment, the system can also be configured to identify, for a given business entity identifier, a number of other, unique business entity identifiers in a business organizational tree for the given business entity identifier. For example, for a given DUNS number, the system can be configured to calculate the number of unique DUNS numbers associated with an appropriate family tree representation related to this given DUNS number. The family tree representations associated with a given DUNS number can comprise, for example: common franchisees; DUNS with minority ownership; DUNS that are all beneath a headquarters with a high propensity to be a buying decision maker for the family tree members underneath (such as those identified by Dun & Bradstreet's Decision HQ platform); DUNS with a common headquarters, a common domestic ultimate, or a common global ultimate based on legal connections (less than 50% ownership); DUNS with a common headquarters, a common domestic ultimate, or a common global ultimate based on analysis of brands used within a set of DUNS; or DUNS with a common headquarters, a common domestic ultimate, or a common global ultimate based on a combination of the aforementioned items. An exemplary system for linking a given business entity identifier, a number of other, unique business entity identifiers in a business organizational tree for the given business entity identifier is described in U.S. Pat. No. 10,152,503, filed on Oct. 29, 2015, and entitled "Data Communications System and Method that Maximize Efficient Usage of Communications Resources", the entirety of which is incorporated by reference herein.

At block 207, the system can also include a business entity mapping module 106 that is configured to analyze and map web traffic content data for the business entity associated with the business entity identifier to attribute data for the business associated with the business entity identifier to generate mapped data 107. In an embodiment, the attribute data for each business entity associated with the business entity identifier comprises firmographic data.

Non limiting examples of company entity data linking, generating firmographic databases and scoring for companies, and data integration from a business entity information database by a business analytics server are described in U.S. Pat. No. 7,822,757, filed on Feb. 18, 2003 entitled "System and Method for Providing Enhanced Information", and U.S. Pat. No. 8,346,790, filed on Sep. 28, 2010 and entitled "Data Integration Method and System", the entirety of each of which is incorporated by reference herein. The firmographic or other attribute data (e.g. the company name, address, NAICS, SIC, employee count, annual sales, index customer count, and ranking/evaluation/risk scores) can be associated with the entity that owns the IP address.

At block 208, the system is configured to generate a training data set 108 of training data 109 and testing data set 110 from the website data traffic content and the attribute data for training an Internet Service Provider (ISP) classifier 101 to identify ISPs associated with the mapped web traffic data 107. The training data 109 and test data 110 can be stored in a training database 108.

In an embodiment, a randomly selected training set can be taken from the full data set of IP web traffic data mapped to the business entity identifier and business entity attribute data by the business entity mapping module 106. This full IP dataset is split into a training set 109 and a test set 110. For example, from an existing IP dataset 104b of over 100,000 IP addresses correlated to business identifiers, the business entity mapping module 106 mapped 28,000 business entities to VI 105 IP addresses to generate a core/mapped data set 107. In the mapped data set 107, about 10,000-14,0000 records overlapped with the extant IP address dataset 104b. This overlapping data from the mapped data set 107 was employed as the training set 109, whereas the remaining non-overlapping data (about 12,000-18,000 records) of the mapped data set 107 were employed as the test set 110.

At block 209, the training data set 108 is used by a model trainer 120 to train an ISP classifier model. A supervised classification model, for example, gradient boosting classification, can be trained and used to determine whether a business identifier mapped to an IP address is ISP traffic or non-ISP traffic. In an embodiment, the model is a Python-based gradient boosting classifier used to classify each business entity identifier (e.g.: DUNS).

Gradient boosting creates a strong learner from an ensemble of weak learners. This classification methodology builds the model in a stage-wise fashion and generalizes those stages by allowing optimization of an arbitrary differentiable loss function. The main goal is to "teach" the model {F} that predicts values of the form y=F(x) by minimizing g, the mean squared error. At each stage m, 1<=m<=M, of gradient boosting, it can be assumed that there is some imperfect model Fm (at the outset, a very weak model that just predicts the mean y in the training set). The gradient boosting algorithm improves on Fm by constructing a new model that adds an estimator b to provide a better model: Fm+1(x)=Fm(x)+b(x). To find h, the gradient boosting solution starts with the observation that a perfect b would imply:

$$Fm+1(x)=Fm(x)+b(x)=y$$

Therefore, gradient boosting fits b to the residual y−Fm (x). As in other boosting variants, each {F(m+1)} attempts to correct the errors of its predecessor Fm. A generalization of this idea to loss functions other than squared error, and to classification and ranking problems, follows from the observation that residuals y−F(x) for a given model are the negative gradients (with respect to F(x)) of the squared error loss function ½(y−F(x))^2. Gradient boosting is a gradient descent algorithm, and generalizing it entails "plugging in" a different loss and its gradient.

Advantageously, it was discovered that at or after 1000 iterations, a gradient boosting model substantially fits the data (almost exactly) and the residuals drop to zero. It was found that gradient boosting fit the data and produced more accurate ISP identification than other classifier models, thus resulting in a more robust and technically accurate system.

At block 210, the system is configured to apply the ISP classifier 101 to a database of VI including website tracking data and identify traffic that is ISP traffic on a website and which traffic is not ISP traffic on the website. At block 210, once the ISP classifier 101 model is trained and confirmed to run accurately, the system can then run the ISP classifier 101 on the full mapped set of VI web traffic data to identify ISPs and non-ISPs. At block 211, the data can then be exported to a user interface 30, or for reports as described below.

Figure 3:
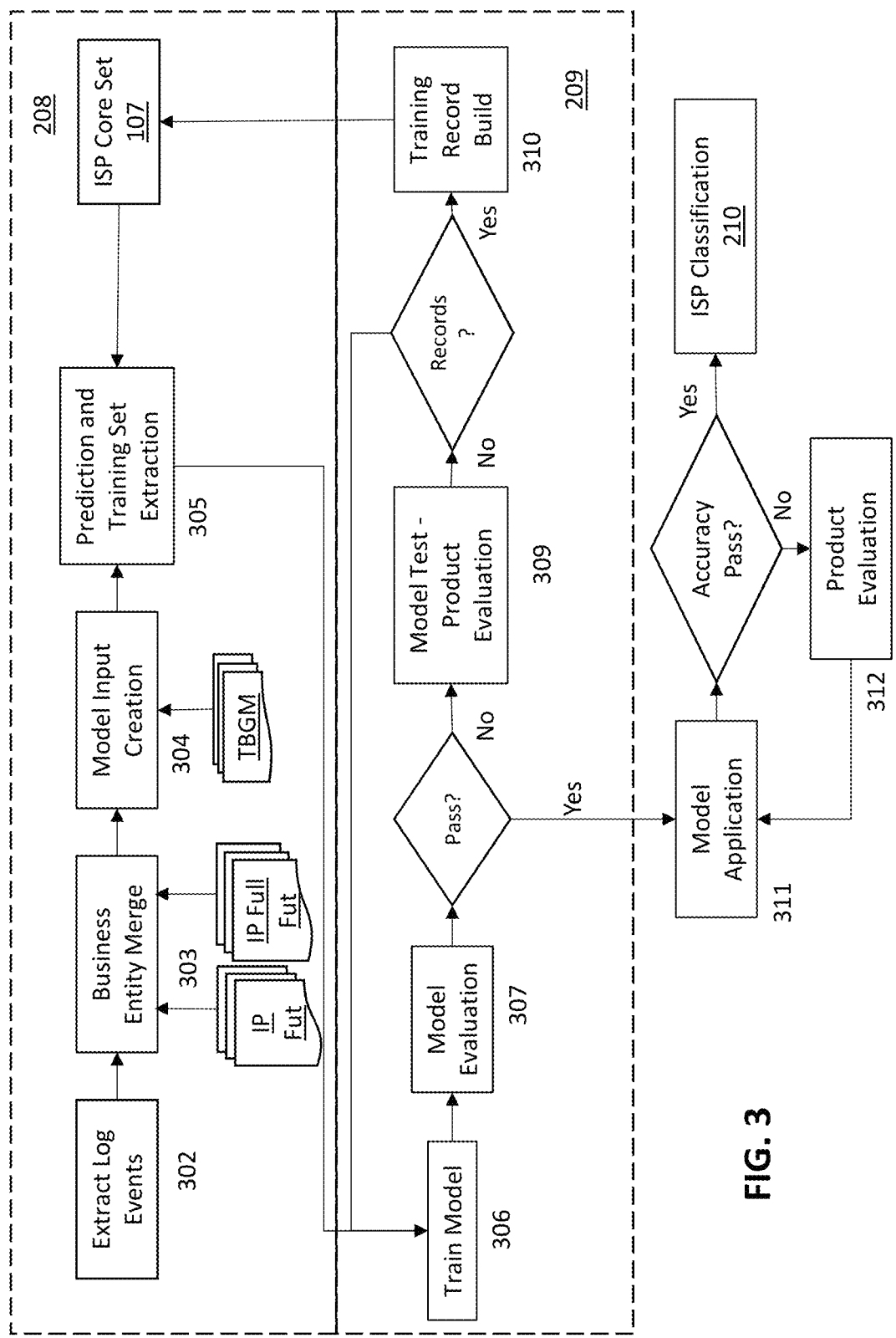
FIG. 3 is a diagram of a flow chart showing a process in accord with an embodiment.

FIG. 3 is a flow chart showing a process for extracting the VI data and generating a training data set 208 (block 208) and training the ISP classifier 101 (block 209) in accordance with an embodiment. At block 302, the system ingests the web traffic data extracts log events, for example, a visitor information log file identifying all IPs and cookies associated with the IPs tracked by the tracking code placed on a website. At block 303, the web traffic data is merged with business entity data. For example, as described herein, the log events of the web traffic data are added and mapped with business entity identifier files as described herein on a business identity site (e.g. a DUNS site). As shown at block 303, databases can include a file that includes web visitor information grouped by IP address for each visitor. At block 304, a classifier model is implemented, for example, a Python-based gradient boosting classifier as described herein. While a decision tree model and a logistic regression model were and can be employed, it was discovered that a gradient boosting classifier when trained proved an optimal classifier, producing more accurate results. It was also determined that the gradient boosting classifier processed the results more quickly than logical regression, which took longer. Thus, gradient boosting classifier improves system latency and accuracy over other classifiers.

In an embodiment, the model input is from business entity firmographic database 104a. At block 305 the prediction and training set of training data are extracted from the merged web traffic data. For example, for a training set 108, the primary key can be the business identity site data (DUNS) and the set can be based on: VI logs, Tri_biz_global_master, Biz_ip, Biz_ip_full, Isp_Core_Set, Isp_Training_Set, Isp_duns_Blacklist, Isp_whitelist_ultduns, and manually flagged records (e.g. up to or over 3000). As described herein, the attributes can be the following features: Visits, Visitors, NAICS Codes (25), Sic Codes (10), Customer Ratio, Employees, Revenue. It was found that these attributes were optimal in training the ISP classifier 101 for ISP identification.

At block 306, the training set 108 is passed to the model training 209 step to train the model. At block 307, once the model is trained the system is configured to evaluate the model at block 312, for example by checking for recall, accuracy and false omission rate (FOR) for the model. Exemplary thresholds for accepting the model as trained are given below.

Threshold for Percent Ratio
1. Green—Below 7%
2. Orange—7-10%
3. Red—Above 10%

Threshold for Recall
1. Green—Above 85%
2. Orange—70-85%
3. Red—Below 70%

Threshold for FOR
1. Green—FOR below 7%
2. Orange—FOR 7-10%
3. Red—FOR Above 10%.

If the thresholds are in appropriate range, then at block 311 the model is pickled and is used for model testing for ISP prediction. A pickled model is loaded on the test set 110 and is applied on it for results. Classified results are based on probability:

50%<probability: Definite Non-ISP
50%>probability: Definite ISP

If the ISP prediction passes, the system classifier 101 is trained and ready for ISP classification of full mapped VI data 107 at block 210.

If the ISP training model evaluation at block 307 does not pass, the system then determines if more training records are needed for the training set 108. If so, at block 310 further VI and/or business attribute data is obtained and processed as described herein to further build the core ISP data set 107, from which training set data is extracted at step 305. If, however, the training set 108 is sufficient for training, the model is iterated again at block 306 until the training thresholds are in the appropriate ranges.

An example of verification results of ISP Classification is given below.

Status: Orange
Total Size of the Training Set: 10649
Total Size of the Prediction Set: 558284
In Training Set—Number of ISP Vs NON-ISPs

TABLE 1

| ISP | NON-ISP | Ratio ISP Over Non-ISP |
|---|---|---|
| 3402 | 7247 | 46.0% |

Confusion matrix for Test Set:

TABLE 2

| Column | Value |
|---|---|
| TP_1 | 532 |
| FP | 95 |
| TN_0 | 1392 |
| FN | 111 |
| Correct | 1924 |
| Wrong | 206 |
| Percent Ratio (WRONG*100/CORRECT) | 10% |
| Recall_Sensitivity (TP*100/(TP + FN)) | 82% |
| False_Omission_Rate_FOR (FN*100/(FN + TN)) | 7% |

At block 309, the trained model is tested for evaluation.

In an embodiment, the model can be tested employing the following Model Confusion Matrix Precision (TP/(TP+FP)), Recall (TP/(TP+FN)), False Omission Rate (FN/(FN+TN)), and False Positive Rate (FP/(FP+TN)).

In an example as shown in Table 3, monthly confusion matrix values after manual prediction were as follows:

TABLE 3

| Column | Value |
|---|---|
| TP_1 | 5 |
| FP | 12 |
| TN_0 | 139 |
| FN | 1 |
| Correct | 144 |
| Wrong | 13 |
| Percent Ratio (WRONG*100/CORRECT) | 9% |
| Recall_Sensitivity (TP*100/(TP + FN)) | 83% |
| False_Omission_Rate_FOR (FN*100/(FN + TN)) | 0% |

As shown in Table 4, total count of ISP and Non-ISP in top 200 records based on ip_duns and visits were:

TABLE 4

| Predicted Isp | Predicted Non Isp |
|---|---|
| 164 | 36 |

An example of an ISP flag comparison between ip_de_ranges and ip_de_ranges_future is shown in Tables 5 and 6:

TABLE 5

| isp_flag | isp_flag_reason | duns | duns_change | duns_future | ip_ranges | ip_ranges_change | ip_ranges_future |
|---|---|---|---|---|---|---|---|
| false | isp_model_class | 454,772 | 24,072 | 478,844 | 4,706,552 | 146,390 | 4,852,942 |
| false | isp_rules | 1,915,420 | −24,304 | 1,891,116 | 4,205,545 | −59,507 | 4,146,038 |
| false | isp_training_set | 6,464 | 170 | 6,634 | 301,903 | −1,615 | 300,288 |
| false | whitelist_duns | 33,369 | −120 | 33,249 | 288,622 | −2,334 | 286,288 |
| true | isp_blacklist | 1,764 | −19 | 1,745 | 622,525 | −18,475 | 604,050 |
| true | isp_model_class | 67,148 | −5,375 | 61,773 | 10,709,439 | −294,461 | 10,414,978 |
| true | isp_rules | 80,603 | −797 | 79,806 | 695,921 | −22,715 | 673,206 |
| true | isp_training_set | 3,408 | −20 | 3,388 | 2,029,646 | −76,121 | 1,953,525 |
| false | n/a | 0 | 0 | 0 | 0 | 0 | 9,226,972 |
| false | | 0 | 0 | 0 | 9,337,291 | 0 | 0 |

TABLE 6

| | Classifier | Rule-based |
|---|---|---|
| Accuracy | 92% ↑ | 80% |
| Recall (TP/TP + FN) | 95% ↑ | 51% |
| FOR (False Omission Rate) | 4% ↓ | 25% |

As shown in Table 7, embodiments as described herein demonstrate ISP identification that is markedly improved over rules-based filtering of ISPs:

Below is a global match rate and customer match rate by client provided ID (customer).

Status: Orange
Global Match_Rate: 30.0
Match Rate by Customer

TABLE 7

| Customer Id | Total Visits | Match Visits | Expected Match | Old Match Rate | Expected Match Rate | Net Match Difference |
|---|---|---|---|---|---|---|
| 180 | 3,612,544 | 3,121,876 | 2,009,093 | 86.0 | 55.0 | −31.0 |
| 176 | 4,431,726 | 3,733,860 | 2,321,640 | 84.0 | 52.0 | −32.0 |
| 4 | 663,032 | 583,852 | 320,229 | 88.0 | 48.0 | −40.0 |
| 117 | 8,056,245 | 7,812,938 | 3,723,820 | 96.0 | 46.0 | −50.0 |
| 223 | 1,954,121 | 1,719,975 | 898,741 | 88.0 | 45.0 | −43.0 |
| 144 | 1,770 | 1,591 | 798 | 89.0 | 45.0 | −44.0 |
| 152 | 219,737 | 191,559 | 98,031 | 87.0 | 44.0 | −43.0 |
| 145 | 4,062 | 3,501 | 1,785 | 86.0 | 43.0 | −43.0 |
| 216 | 629,311 | 547,739 | 274,414 | 87.0 | 43.0 | −44.0 |
| 205 | 49,477,420 | 42,294,720 | 20,245,816 | 85.0 | 40.0 | −45.0 |
| 132 | 33,634 | 30,829 | 13,703 | 91.0 | 40.0 | −51.0 |
| 173 | 28,364,036 | 23,623,912 | 11,183,260 | 83.0 | 39.0 | −44.0 |
| 215 | 50,735 | 44,634 | 18,855 | 87.0 | 37.0 | −50.0 |
| 198 | 87,331 | 78,348 | 32,699 | 89.0 | 37.0 | −52.0 |
| 202 | 114,135 | 95,922 | 43,249 | 84.0 | 37.0 | −47.0 |
| 56 | 244,551 | 185,514 | 89,058 | 75.0 | 36.0 | −39.0 |
| 36 | 18,724,794 | 14,865,381 | 6,766,908 | 79.0 | 36.0 | −43.0 |
| 130 | 1,802 | 1,525 | 661 | 84.0 | 36.0 | −48.0 |
| 189 | 33,741 | 25,601 | 12,086 | 75.0 | 35.0 | −40.0 |
| 122 | 747,029 | 641,866 | 266,236 | 85.0 | 35.0 | −50.0 |
| 174 | 8,706,731 | 7,433,437 | 3,104,970 | 85.0 | 35.0 | −50.0 |
| 170 | 3,589,384 | 2,776,738 | 1,267,131 | 77.0 | 35.0 | −42.0 |
| 67 | 1,318,716 | 1,015,129 | 465,161 | 76.0 | 35.0 | −41.0 |
| 185 | 4,015 | 3,303 | 1,391 | 82.0 | 34.0 | −48.0 |
| 163 | 4,973,387 | 3,880,258 | 1,676,282 | 78.0 | 33.0 | −45.0 |
| 220 | 78,496 | 69,183 | 26,634 | 88.0 | 33.0 | −55.0 |
| 111 | 5,302,843 | 4,290,923 | 1,703,623 | 80.0 | 32.0 | −48.0 |
| 91 | 15,722 | 13,328 | 5,171 | 84.0 | 32.0 | −52.0 |
| 147 | 10,791 | 8,236 | 3,354 | 76.0 | 31.0 | −45.0 |
| 5 | 6,330 | 818 | 1,967 | 12.0 | 31.0 | 19.0 |
| 217 | 95,591 | 77,777 | 29,980 | 81.0 | 31.0 | −50.0 |
| 74 | 211,145 | 161,518 | 66,833 | 76.0 | 31.0 | −45.0 |
| 115 | 26,975 | 20,510 | 8,428 | 76.0 | 31.0 | −45.0 |
| 199 | 104,588 | 91,591 | 32,017 | 87.0 | 30.0 | −57.0 |
| 196 | 72,294 | 62,780 | 22,213 | 86.0 | 30.0 | −56.0 |
| 224 | 6,514 | 4,992 | 1,973 | 76.0 | 30.0 | −46.0 |
| 193 | 57,157 | 48,127 | 17,117 | 84.0 | 29.0 | −55.0 |
| 3 | 5,444,961 | 3,608,749 | 1,583,501 | 66.0 | 29.0 | −37.0 |
| 219 | 30,241 | 21,263 | 9,018 | 70.0 | 29.0 | −41.0 |
| 30 | 582,210 | 493,358 | 163,131 | 84.0 | 28.0 | −56.0 |
| 212 | 3,015,528 | 2,637,934 | 863,305 | 87.0 | 28.0 | −59.0 |
| 143 | 763 | 529 | 220 | 69.0 | 28.0 | −41.0 |
| 90 | 11,179,781 | 9,165,383 | 3,100,349 | 81.0 | 27.0 | −54.0 |
| 104 | 791,787 | 666,565 | 219,295 | 84.0 | 27.0 | −57.0 |
| 81 | 1,928,844 | 1,480,773 | 523,482 | 76.0 | 27.0 | −49.0 |
| 107 | 5,716,176 | 4,288,297 | 1,523,771 | 75.0 | 26.0 | −49.0 |
| 94 | 3,747,065 | 3,089,269 | 986,113 | 82.0 | 26.0 | −56.0 |
| 66 | 106,454 | 88,515 | 28,417 | 83.0 | 26.0 | −57.0 |
| 106 | 65,862 | 51,404 | 16,808 | 78.0 | 25.0 | −53.0 |
| 149 | 1,053,357 | 923,740 | 271,377 | 87.0 | 25.0 | −62.0 |
| 231 | 4,586,037 | 3,840,676 | 1,190,947 | 83.0 | 25.0 | −58.0 |
| 200 | 111,924 | 92,583 | 28,959 | 82.0 | 25.0 | −57.0 |
| 140 | 219,893 | 186,286 | 57,163 | 84.0 | 25.0 | −59.0 |
| 191 | 3,575,201 | 2,749,788 | 878,807 | 76.0 | 24.0 | −52.0 |
| 42 | 124,130 | 105,674 | 29,892 | 85.0 | 24.0 | −61.0 |
| 184 | 1,698,656 | 1,343,323 | 421,717 | 79.0 | 24.0 | −55.0 |
| 129 | 3,060,056 | 2,735,551 | 713,079 | 89.0 | 23.0 | −66.0 |
| 78 | 1,036,640 | 788,031 | 242,203 | 76.0 | 23.0 | −53.0 |
| 175 | 3,196,289 | 2,449,142 | 727,045 | 76.0 | 22.0 | −54.0 |
| 207 | 4,157,641 | 3,183,544 | 937,362 | 76.0 | 22.0 | −54.0 |
| 186 | 862 | 794 | 195 | 92.0 | 22.0 | −70.0 |
| 101 | 224,488 | 174,240 | 51,466 | 77.0 | 22.0 | −55.0 |
| 182 | 304,427 | 254,101 | 69,157 | 83.0 | 22.0 | −61.0 |
| 71 | 62,387 | 51,478 | 13,814 | 82.0 | 22.0 | −60.0 |
| 146 | 194,369 | 162,968 | 41,847 | 83.0 | 21.0 | −62.0 |
| 123 | 7,938,336 | 6,367,336 | 1,711,918 | 80.0 | 21.0 | −59.0 |
| 195 | 5 | 4 | 1 | 80.0 | 20.0 | −60.0 |
| 112 | 5,688,123 | 4,741,890 | 1,124,233 | 83.0 | 19.0 | −64.0 |

TABLE 7-continued

| Customer Id | Total Visits | Match Visits | Expected Match | Old Match Rate | Expected Match Rate | Net Match Difference |
|---|---|---|---|---|---|---|
| 92 | 3,483,733 | 2,538,628 | 647,798 | 72.0 | 18.0 | −54.0 |
| 37 | 699,085 | 469,880 | 127,676 | 67.0 | 18.0 | −49.0 |
| 167 | 17,834 | 10,992 | 3,175 | 61.0 | 17.0 | −44.0 |
| 58 | 11,933,670 | 9,467,613 | 2,101,328 | 79.0 | 17.0 | −62.0 |
| 2 | 1,332,854 | 721,969 | 224,551 | 54.0 | 16.0 | −38.0 |
| 61 | 620,944 | 546,544 | 101,048 | 88.0 | 16.0 | −72.0 |
| 110 | 49,576,102 | 40,236,628 | 8,072,378 | 81.0 | 16.0 | −65.0 |
| 148 | 2,167 | 1,725 | 339 | 79.0 | 15.0 | −64.0 |
| 209 | 1,421,107 | 1,271,335 | 185,382 | 89.0 | 13.0 | −76.0 |
| 194 | 4,655 | 1,135 | 632 | 24.0 | 13.0 | −11.0 |
| 192 | 845,915 | 685,178 | 97,840 | 80.0 | 11.0 | −69.0 |
| 230 | 841 | 0 | 94 | 0.0 | 11.0 | 11.0 |
| 171 | 244,579 | 214,585 | 25,493 | 87.0 | 10.0 | −77.0 |
| 213 | 84 | 82 | 9 | 97.0 | 10.0 | −87.0 |
| 75 | 14 | 14 | 1 | 100.0 | 7.0 | −93.0 |
| 1 | 35 | 22 | 2 | 62.0 | 5.0 | −57.0 |
| 41 | 1 | 1 | 0 | 100.0 | 0.0 | −100.0 |
| 154 | 15 | 15 | 0 | 100.0 | 0.0 | −100.0 |
| 100 | 4 | 1 | 0 | 25.0 | 0.0 | −25.0 |
| 208 | 82 | 0 | 0 | 0.0 | 0.0 | 0.0 |
| 236 | 2 | 0 | 0 | 0.0 | 0.0 | 0.0 |
| 233 | 5 | 5 | 0 | 100.0 | 0.0 | −100.0 |

As shown in Tables 8-10, exemplary results of Top ISPs and Non-ISPs are identified employing the matching as described herein.

Top 20 ISP List

TABLE 8

| Ip_Duns | Business Name | Ultimate Business Name | Duns Source | Total Visits |
|---|---|---|---|---|
| 0######5 | Cxxxxxxxxxxxxxx | | matched | 2,786,590 |
| 0######9 | Cxxxxxxxxxxxxxx | | matched | 2,160,489 |
| 0######6 | Mxxxxxxxx | Mxxxxxxxxxx | matched | 1,619,811 |
| 0######6 | Mxxxxxxxxxx | Mxxxxxxxxxx | matched | 1,439,169 |
| 0######6 | Cxxxxxxxxxxxxxx | | matched | 1,430,790 |
| 0######7 | Cxxxxxxxxxxxxxx | | matched | 1,362,165 |
| 7######0 | Cxxxxxxxxxxxxxx | Cxxxxxxxxxxxxxx | matched | 1,328,736 |
| 0######1 | Cxxxxxxxxxxxxxx | Cxxxxxxxxxxxxxx | matched | 1,234,267 |
| 0######0 | Cxxxxxxxxxxxxxx | Cxxxxxxxxxxxxxx | matched | 1,229,047 |
| 3######3 | Dxxxxxxxxxxxx | Dxxxxxxxxxxxx | matched | 1,154,263 |
| 0######7 | Cxxxxxxxx, LLC | Cxxxxxxxxxxxxxx | matched | 1,102,568 |
| 6######3 | Rxxxxxxxxxx | Rxxxxxxxxx | matched | 1,087,392 |
| 1######5 | Cxxxxxxxxx | | matched | 1,055,438 |
| 8######2 | Uxxxxxxx. | Axxxxxxxxxxxx. | matched | 797,256 |
| 1######8 | Cxxxxxxxxxxxx | | matched | 779,244 |
| 0######9 | Mxxxxxxxxxx | Mxxxxxxxxxx | matched | 772,243 |
| 5######7 | Cxxxxxxxxxxxxxx | Cxxxxxxxxxxxxxx | matched | 763,058 |
| 8######1 | Cxxxxxxxxxxxxxx | Cxxxxxxxxxxxxxx | matched | 689,925 |
| 0######6 | Cxxxxxxxxxxxxxx | | matched | 640,604 |
| 6######3 | Txxxxxxxxxxxxxx | | matched | 605,671 |

Top 20 Non ISP List

TABLE 9

| Ip_Duns | Business Name | Ultimate Business Name | Duns Source | Total Visits |
|---|---|---|---|---|
| 0######3 | Gxxxxxxxxxxxx | Bxxxxxxxxxxxx | matched, profound | 13,943,235 |
| 0######0 | Hxxxxxxxxxxx | Hxxxxxxxxxxxxxx | domain_ult, matched, override | 3,560,714 |
| 0######6 | Mxxxxxxxxxxxx | Mxxxxxxxxxxxx | matched | 2,623,951 |
| 0######9 | Mxxxxxxxxxx | Mxxxxxxxxxxxx | domain_ult, matched, profound | 1,722,273 |
| 1######1 | Sxxxxxxxxxxxx | Axxxxxxxxxxxx | matched | 1,321,741 |
| 0######7 | Cxxxxxxxxxxxxxx | | adaptive, matched | 1,052,095 |
| 0######4 | Cxxxxxxxxxxxxxx | | adaptive, matched | 866,549 |
| 0######5 | Exxxxxxxxxxxx | Exxxxxxxxxxxx | matched | 778,312 |
| 0######7 | Nxxxxxxxxxxxxx | | matched | 534,543 |
| 0######4 | Sxxxxxxxxxxxxxx | | matched | 502,138 |
| 0######9 | Cxxxxxxxxxxxxxx | Cxxxxxxxxxxxxxx | addaptive, matched | 433,448 |
| 3######9 | Bxxxxxxxxxxxx | Bxxxxxxxxxxxx | matched | 338,030 |
| 0######2 | Hxxxxxxxxxxxx | Hxxxxxxxxxxxx | domain_ult, matched, override, profound | 321,186 |
| 0######2 | Cxxxxxxxxxxxxxx | | adaptive, matched | 303,871 |
| 0######4 | Gxxxxxxxxxxxx | | matched, matched | 291,057 |
| 8######0 | Mxxxxxxxxxxxx | Mxxxxxxxxxxxx | matched | 278,254 |
| 4######4 | Gxxxxxxxxxxxx | | matched | 210,460 |
| 0######7 | Cxxxxxxxxxxxxxx | Cxxxxxxxxxxxxxx | adaptive, matched | 207,265 |
| 0######6 | Exxxxxxxxxxxx | Dxxxxxxxxxxx | domain_site, matched | 206,299 |
| 1######8 | Cxxxxxxxxxxxxxx | Cxxxxxxxxxxxxxx | adaptive, matched | 197,388 |

Top 20 Non ISP where response duns ID is null

TABLE 10

| Ip_Duns | Business Name | Ultimate Business Name | Duns Source | Total Visits |
|---|---|---|---|---|
| 0######3 | Gxxxxxxx | Bxxxxxxxxxxxx | matched, profound | 13,915,438 |
| 08######9 | Mxxxxxxxxxxx | Mxxxxxxxxxxx | domain_ult, matched, profound | 1,720,959 |
| 0######6 | Mxxxxxxxxxxx | Mxxxxxxxxxxx | matched | 1,048,433 |
| 0######7 | Cxxxxxxxxxxxxxx | | addaptive, matched | 907,598 |
| 0######4 | Cxxxxxxxxxxxxxx | | adaptive, matched | 751,446 |
| 0######4 | Sxxxxxxxxxxxxxx | | matched | 501,871 |
| 0######9 | Cxxxxxxxxxxxxxx | Cxxxxxxxxxxxxxx | adaptive, matched | 371,228 |
| 8######0 | Mxxxxxxxxxxxxx | Mxxxxxxxxxxxxx | matched | 272,710 |
| 0######2 | Cxxxxxxxxxxxx | | adaptive, matched | 250,863 |
| 0######4 | Gxxxxxxxxxxxx | | matched, matched | 242,059 |
| 4######4 | Gxxxxxxxxxxxx | | matched | 195,346 |

TABLE 10-continued

| | | | | |
|---|---|---|---|---|
| 0#######4 | Gxxxxxxxxxxxxxx | Bxxxxxxxxxxxx | matched | 190,395 |
| 0#######7 | Cxxxxxxxxxxxxxx | Cxxxxxxxxxxxxxx | adaptive, matched | 173,881 |
| 1#######8 | Cxxxxxxxxxxxxxx | Cxxxxxxxxxxxxxx | adaptive, matched | 167,336 |
| 0#######0 | Hxxxxxxxxxxxxxx | Hxxxxxxxxxxxxxx | domain_ult, matched, override | 152,645 |
| 7#######5 | Ixxxxxxxxxxxxxx | Ixxxxxxxxxxxxxx | matched, profound | 149,002 |
| 5#######5 | Ixxxxxxxxxxxxxx | Ixxxxxxxxxxxxxx | matched, profound | 142,579 |
| 0#######1 | Fxxxxxxxxxxxxxx | | matched | 141,440 |
| 7#######5 | Gxxxxxxxxxxxxxx | Gxxxxxxxxxxxxxx | matched | 130,671 |
| 3#######9 | Bxxxxxxxxxxxxxx | Bxxxxxxxxxxxxxx | matched | 129,968 |

Moreover, the classifier model successfully identified numerous ISP visitors that the rules-based approach identified as Non-ISPs, which a manual approach would not identify. For example, as shown in Tables 11-12, the system newly identified US and global traffic that were ISPs that prior and conventional approaches could not identify:

US Traffic

TABLE 11

| DUNS | Company Name | VI Before Model | Identified by ISP Classification Model |
|---|---|---|---|
| 0#######6 | Txxxxxxxxxxxx | Non-ISP | ISP |
| 0#######9 | Txxxxxxxxxxxx | Non-ISP | ISP |
| 6#######4 | Mxxxxxxxxxxxx | Non-ISP | ISP |
| 0#######0 | Txxxxxxxxxxxx | Non-ISP | ISP |
| 0#######7 | Sxxxxxxxxxxxx | Non-ISP | ISP |
| 1#######5 | Nxxxxxxxxxxxx | Non-ISP | ISP |
| 0#######1 | Txxxxxxxxxxxx | Non-ISP | ISP |
| 1#######8 | Pxxxxxxxxxxxx | Non-ISP | ISP |

Non-US Traffic

TABLE 12

| DUNS | Company Name | VI Before Model | Identified by ISP Classification Model |
|---|---|---|---|
| 6#######3 | Rxxxxxxxxxxxx | Non-ISP | ISP |
| 3#######6 | Axxxxxxxxxxxx | Non-ISP | ISP |
| 6#######0 | Txxxxxxxxxxxx | Non-ISP | ISP |
| 8#######4 | Hxxxxxxxxxxxx | Non-ISP | ISP |
| 6#######5 | Axxxxxxxxxxxx | Non-ISP | ISP |
| 8#######7 | Lxxxxxxxxxxxx | Non-ISP | ISP |
| 7#######7 | Zxxxxxxxxxxxx | Non-ISP | ISP |

Notifications

As the system classifier 101 processes on real web traffic data and results impact directly, the system also employs automated notification gates at stages to keep the classifier optimized and on track. The system is configured to provide automated notifications if the confusion matrix or output results are not accurate.

In an embodiment, the system is configured with over 10 notification gates at each level of a model run, including:
  Notifications for training set releasing total records;
  Notifications for measuring the accuracy of the training set;
  Notification for test set releasing total records in the training set;
  Notification on global match rate for VI after producing total ISPs;
  Notification on customer match rate for VI after producing total ISPs ("Refer"). In an embodiment, this match rate is the main metric to measure the performance of the product for VI);
  Notifications associated to top ISP, Non-ISP before and after the model run.

Returning to FIG. 2, at block 210, once the model is trained and confirmed to run accurately, the system can then run the classifier on the full mapped set 107 of VI web traffic data to identify ISPs and non-ISPs. In an embodiment, rules-based processing can be employed to classify data that was not able to be processed by the classifier, for example, web tracking data that could not be mapped to business entity identifiers (e.g.: unmatched data for total visitors, unique visitors). At block 211, the data can then be exported to a user interface 30, or for reports as described herein.

In another embodiment, the classifier was run on IP addresses matched to business identity identifiers but not mapped to VI. For example, in the embodiment, the system is configured to take a database of IP addresses 104b mapped to business entity identifications 102 from a business entity firmographic database 104a. The system is also configured to map firmographic attribute data for each business entity associated with the business entity identifier from the firmographic database 104a as described herein. As also described herein, the attributes can include the following features: Visits, Visitors, NAICS Codes, SIC Codes, Customer Ratio, Employees, and Revenue. It was found that these attributes were optimal in training the ISP classifier 101 for ISP identification. However, it was further discovered that running the classifier on a database of mapped, firmographic attribute-enriched identified IP addresses, the classifier was able to identify ISPs and non-ISPs, even without VI data 105 attributes. For example, all VI 105 visit information was zeroed (Visits, Visitors), but all other attributes were filled (NAICS Codes, SIC Codes, Customer Ratio, Employees, Revenue) in order to run the classifier on a database of over 500,000 mapped, firmographic attribute-enriched IP addresses 104b that were mapped to business entity identifiers but without VI. The classifier was still able to classify ISPs and non-ISPs even without the VI 105 based on the other, remaining attribute information. Accordingly, once the model is trained and confirmed to run accurately, in an embodiment, the system can be configured to run the classifier on mapped data 107 where web tracking data is not able be mapped to business entity identifiers (e.g.: unmatched data for total visitors, unique visitors), but the IP addresses can still be matched and firmographically enriched with other attribute data.

As explained above, data can be collected to cover a given time window (e.g.: a weekly time interval, a bi-weekly interval, a monthly interval, a bi-monthly interval, and/or a quarterly interval). For example, in an embodiment, every month the system can ingest and map the data and run the classifier 101 as shown in FIGS. 2-3 to identify ISP and non-ISP web traffic. The system is also configured for continuous maintenance of the model. For example, in an embodiment, for a subsequent periodic run of the classifier on mapped VI data for that period, the system can generate sample records from model output that is not already in the training set 108. For example, each monthly run of the classifier produces output classification output. For supervised classification, there can be a manual review and consolidation of records. Then the revised dataset can be appended to the next monthly cycle of the model run and update the training of the model.

Figure 7:
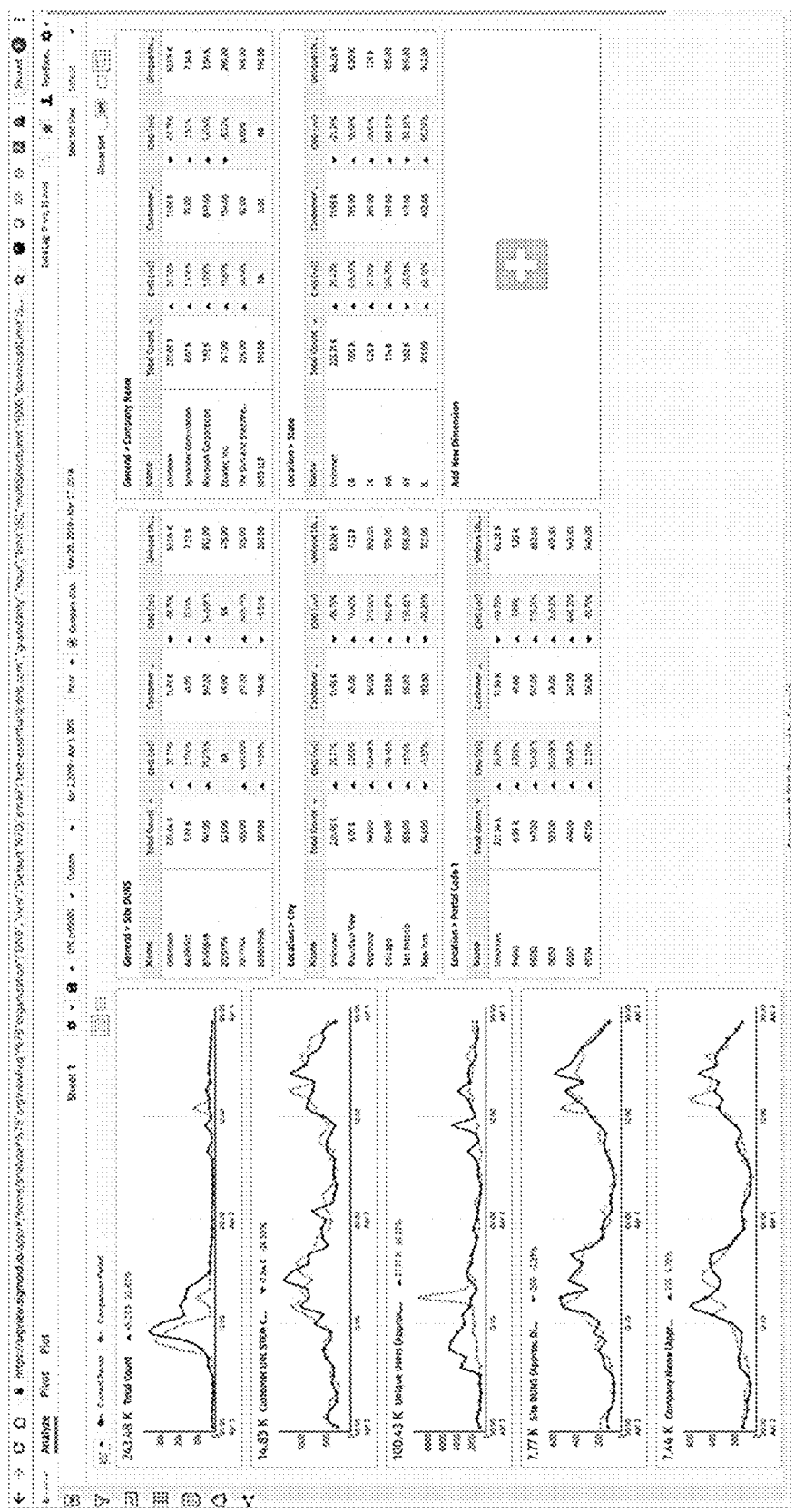
FIG. 7 shows an example graphical user interface according to an embodiment.

Reports can be provided via, inter alia, a user interface 30 as shown in FIG. 7.

As will be appreciated, in embodiments, databases and data therein, though shown in particular modules, can be shared and accessed across components and modules of the system and need not be located in specific components for access to the data for, among other things, semantic direction value analysis as described herein. The logical architecture and operational flows disclosed herein are illustrated to describe embodiments in an exemplary manner without limitations to a specific architecture, as skilled artisans may modify architecture design when, for instance, implementing the teachings of the present disclosure into their own systems.

Illustrative Operating Environment

Figure 4A:
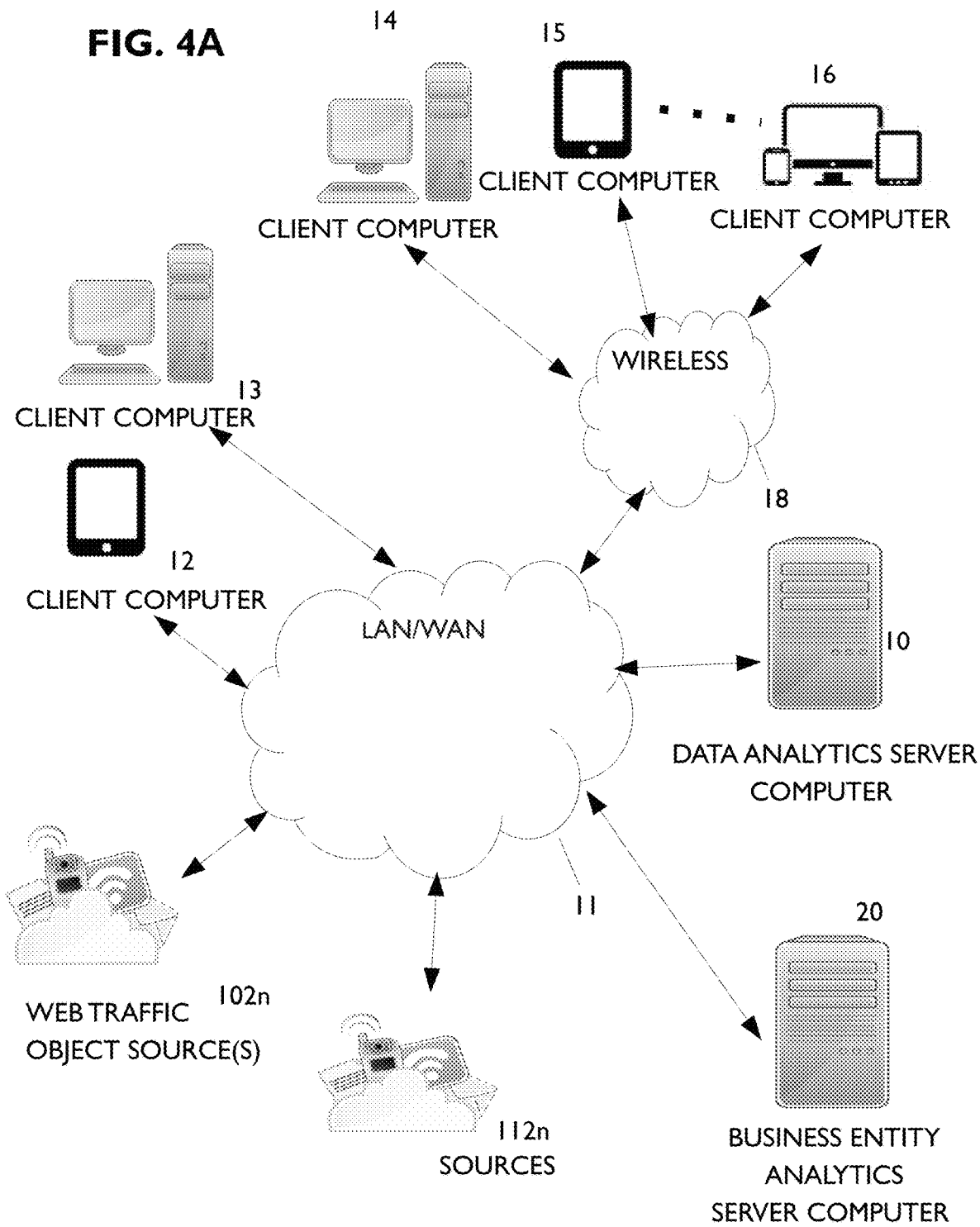

FIG. 4A shows components of an embodiment of an environment 101 in which embodiments of the present disclosure can be practiced. Not all of the components may be required to practice the innovations, and variations in the arrangement and type of the components can be made without departing from the spirit or scope of the present disclosure. As shown, FIG. 4 includes local area networks (LANs)/wide area networks (WANs) network 11, wireless network 18, client computers 12-16, Data Analytics Server Computer 10, a Business Entity Analytics Server Computer 20, Web Traffic Object Sources 102n and Other Data Sources 112n.

At least one embodiment of client computers 12-16 is described in more detail below in conjunction with FIG. 5. In one embodiment, at least some of client computers 12-16 can operate over a wired and/or wireless network, such as networks 11 and/or 18. Generally, client computers 12-16 can include virtually any computer capable of communicating over a network to send and receive information, perform various online activities, offline actions, or the like. In one embodiment, one or more of client computers 12-16 can be configured to operate in a business or other entity to perform a variety of services for the business or other entity. For example, client computers 12-16 can be configured to operate as a web server or an account server. However, client computers 12-16 are not constrained to these services and can also be employed, for example, as an end-user computing node, in other embodiments. It should be recognized that more or less client computers can be included within a system such as described herein, and embodiments are therefore not constrained by the number or type of client computers employed.

Computers that can operate as client computers 12-16 can include computers that typically connect using a wired or wireless communications medium, such as personal computers, multiprocessor systems, microprocessor-based or programmable electronic devices, network PCs, or the like. In some embodiments, client computers 12-16 can include virtually any portable personal computer capable of connecting to another computing device and receiving information, such as, laptop computer 13, smart mobile telephone 12, and tablet computers 15, and the like. However, portable computers are not so limited and can also include other portable devices, such as cellular telephones, radio frequency (RF) devices, infrared (IR) devices, Personal Digital Assistants (PDAs), handheld computers, wearable computers, vehicle computers, and integrated devices combining one or more of the preceding devices, and the like. As such, client computers 12-16 typically range widely in terms of capabilities and features. Moreover, client computers 12-16 are configured to access various computing applications, including a browser, or other web-based applications.

A web-enabled client computer can include a browser application that is configured to receive and to send web pages, web-based messages, and the like. The browser application can be configured to receive and display graphics, text, multimedia, and the like, employing virtually any web-based language, including wireless application protocol messages (WAP), and the like. In one embodiment, the browser application is enabled to employ Handheld Device Markup Language (HDML), Wireless Markup Language (WML), WMLScript, JavaScript, JavaScript Object Notation (JSON), Standard Generalized Markup Language (SGML), HyperText Markup Language (HTML), eXtensible Markup Language (XML), and the like, to display and send a message. In one embodiment, a user of the client computer can employ the browser application to perform various activities over a network (online). However, another application can also be used to perform various online activities.

Client computers 12-16 can also include at least one other client application that is configured to receive and/or send content with another computer. The client application can include a capability to send and/or receive content, or the like. The client application can further provide information that identifies itself, including a type, capability, name, and the like. In one embodiment, client computers 12-16 can uniquely identify themselves through any of a variety of mechanisms, including an Internet Protocol (IP) address, a phone number, Mobile Identification Number (MIN), an electronic serial number (ESN), or other device identifier. Such information may be provided in a network packet, or the like, sent between other client computers, Data Analytics Server Computer 10, Business Entity Analytics Server Computer 20, or other computers.

Client computers 12-16 can further be configured to include a client application that enables an end-user to log into an end-user account that can be managed by another computer, such as Data Analytics Server Computer 10, a Business Entity Analytics Server Computer 20, Web Traffic Object Sources 102n and Other Data Sources 112n, or the like. Such end-user account, in one non-limiting example, can be configured to enable the end-user to manage one or more online activities, including in one non-limiting example, search activities, social networking activities, browse various websites, communicate with other users, or the like. However, participation in such online activities can also be performed without logging into the end-user account.

Wireless network 18 is configured to couple client computers 14-16 and its components with network 11. Wireless network 18 can include any of a variety of wireless sub-networks that can further overlay stand-alone ad-hoc networks, and the like, to provide an infrastructure-oriented connection for client computers 14-16. Such sub-networks can include mesh networks, Wireless LAN (WLAN) networks, cellular networks, and the like. In one embodiment, the system can include more than one wireless networks.

Wireless network 18 can further include an autonomous system of terminals, gateways, routers, and the like connected by wireless radio links, and the like. These connectors can be configured to move freely and randomly and organize themselves arbitrarily, such that the topology of wireless network 18 may change rapidly.

Wireless network 18 can further employ a plurality of access technologies including 2nd (2G), 3rd (3G), 4th (4G) 5th (5G) generation radio access for cellular systems, WLAN, Wireless Router (WR) mesh, and the like. Access technologies, such as 2G, 3G, 4G, 5G, and future access networks can enable wide area coverage for mobile devices, such as client computers 14-16 with various degrees of mobility. In one non-limiting example, wireless network 18 can enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 18 can include virtually any wireless communication mechanism by which information may travel between client computers 14-16 and another computer, network, and the like.

Network 11 is configured to couple network computers with other computers and/or computing devices, including, Data Analytics Server Computer 10, a Business Entity Analytics Server Computer 20, Web Traffic Object Sources 102*n* and Other Data Sources, client computers 12, 13 and client computers 14-16 through wireless network 18. Network 11 is enabled to employ any form of computer readable media for communicating information from one electronic device to another. Also, network 11 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links in LANs typically include twisted wire pair or coaxial cable, while communication links between networks can utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links can further employ any of a variety of digital signalling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 11 can be configured to transport information of an Internet Protocol (IP). In essence, network 11 includes any communication method by which information can travel between computing devices.

Additionally, communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

One embodiment of a server computer that can be employed as a Data Analytics Server Computer 10 or a Business Entity Analytics Server Computer 20 is described in more detail below in conjunction with FIG. 4. Briefly, server computer includes virtually any network computer capable of hosting the modules as described herein. Computers that can be arranged to operate as a server computer include various network computers, including, but not limited to, desktop computers, multiprocessor systems, network PCs, server computers, network appliances, and the like.

Although FIG. 4A illustrates each of Data Analytics Server Computer 10 or a Business Entity Analytics Server Computer 20 as a single computer, the present disclosure is not so limited. For example, one or more functions of a server computer can be distributed across one or more distinct network computers. Moreover, the computer servers are not limited to a particular configuration. Thus, in one embodiment, a server computer can contain a plurality of network computers. In another embodiment, a server computer can contain a plurality of network computers that operate using a master/slave approach, where one of the plurality of network computers of the server computers are operative to manage and/or otherwise coordinate operations of the other network computers. In other embodiments, a server computer can operate as a plurality of network computers arranged in a cluster architecture, a peer-to-peer architecture, and/or even within a cloud architecture. Thus, the present disclosure is not to be construed as being limited to a single environment, and other configurations, and architectures are also envisaged.

Although illustrated separately, Data Analytics Server Computer 10 and Business Entity Analytics Server Computer 20 can be employed as a single network computer or computer platform, separate network computers, a cluster of network computers, or the like. In some embodiments, either Data Analytics Server Computer 10 and Business Entity Analytics Server Computer 20, or both, can be enabled to deliver content, respond to user interactions with the content, track user interaction with the content, update widgets and widgets controllers, or the like. Moreover, Data Analytics Server Computer 10 and Business Entity Analytics Server Computer 20 are described separately, and it will be appreciated that these servers hosted by or can be configured to operate on other platforms.

As described herein, embodiments of the system 10, processes and algorithms can be configured to run on a web services platform host such as Amazon Web Services (AWS)® or Microsoft Azure®. A cloud computing architecture is configured for convenient, on-demand network access to a shared pool of configurable computing resources (e.g. networks, network bandwidth, servers, processing, memory, storage, applications, virtual machines, and services). A cloud computer platform can be configured to allow a platform provider to unilaterally provision computing capabilities, such as server time and network storage, as needed automatically without requiring human interaction with the service's provider. Further, cloud computing is available over a network and accessed through standard mechanisms that promote use by heterogeneous thin or thick client platforms (e.g., mobile phones, laptops, and PDAs). In a cloud computing architecture, a platform's computing resources can be pooled to serve multiple consumers, partners or other third-party users using a multi-tenant model, with different physical and virtual resources dynamically assigned and reassigned according to demand. A cloud computing architecture is also configured such that platform resources can be rapidly and elastically provisioned, in some cases automatically, to quickly scale out and rapidly released to quickly scale in.

Cloud computing systems can be configured with systems to automatically control and optimize resource use by leveraging a metering capability at some level of abstraction appropriate to the type of service (e.g., storage, processing, bandwidth, and active user accounts). Resource usage can be monitored, controlled, and reported. As described herein, in embodiments, the system 10 is advantageously configured by the platform provider with innovative algorithms and database structures.

A cloud computing architecture includes a number of service and platform configurations.

A Software as a Service (SaaS) is configured to allow a platform provider to use the provider's applications running on a cloud infrastructure. The applications are accessible from various client devices through a thin client interface such as a web browser (e.g., web-based e-mail). The consumer typically does not manage or control the underlying cloud infrastructure including network, servers, operating systems, storage, or even individual application capabilities, with the possible exception of limited user-specific application configuration settings.

A Platform as a Service (PaaS) is configured to allow a platform provider to deploy onto the cloud infrastructure consumer-created or acquired applications created using programming languages and tools supported by the provider. The consumer does not manage or control the underlying cloud infrastructure including networks, servers, operating systems, or storage, but can have control over the deployed applications and possibly over the application hosting environment configurations.

An Infrastructure as a Service (IaaS) is configured to allow a platform provider to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

A cloud computing architecture can be provided as a private cloud computing architecture, a community cloud computing architecture, or a public cloud computing architecture. A cloud computing architecture can also be configured as a hybrid cloud computing architecture comprising two or more cloud platforms (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4B:
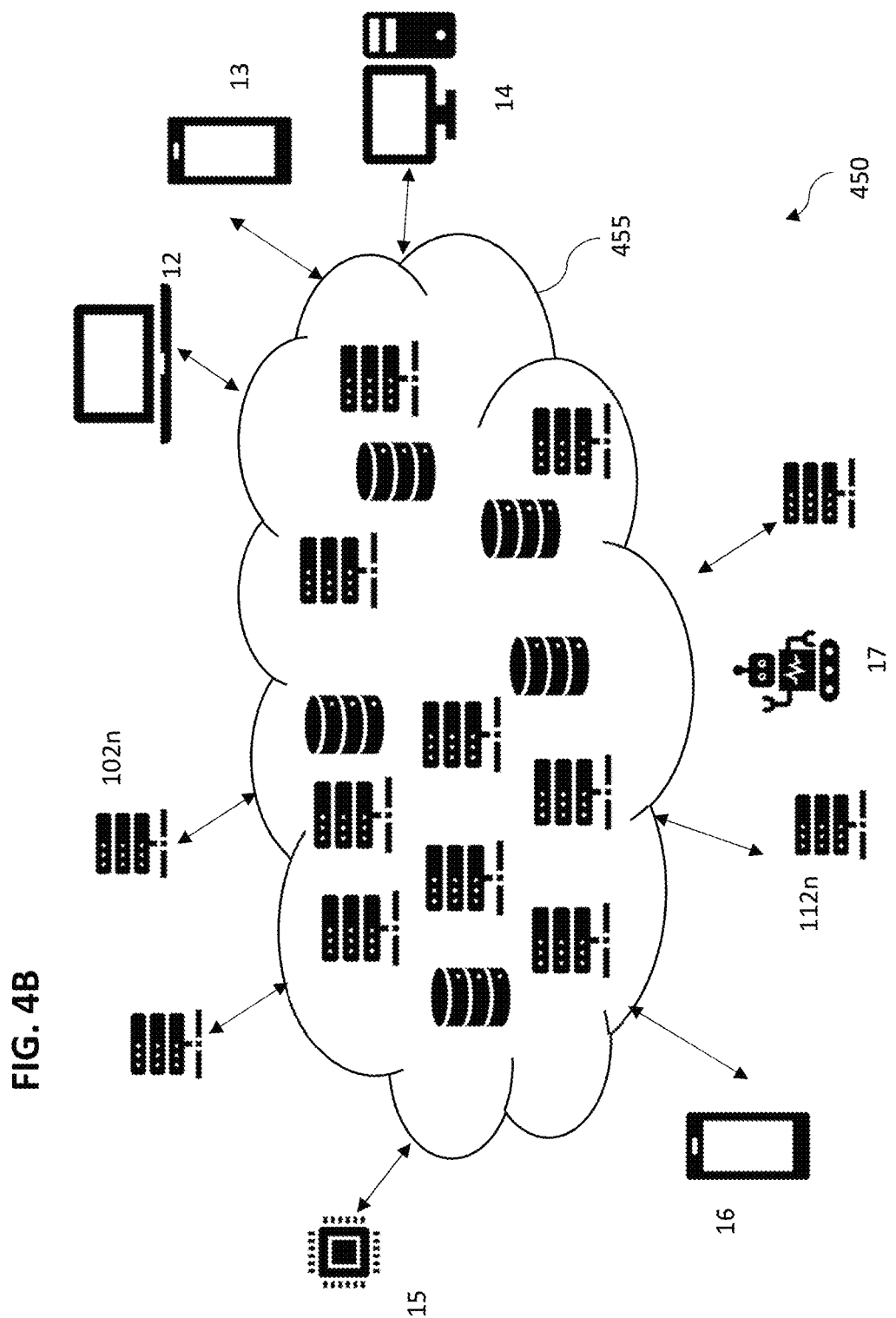

Referring now to FIG. 4B, an illustrative cloud computing environment 450 is depicted. As shown, cloud computing environment 450 comprises one or more cloud computing nodes 455 with which local computing devices are used by cloud consumers, such as, for example, personal digital assistant (PDA) or cellular telephone 13, desktop computer 14, laptop computer 12, sensor data source 15, web traffic data source 102*n*, and integrated machine data source 17 and/or other computer system or device data source 112*n*. Nodes 455 can communicate with one another. They can be grouped (not shown) physically or virtually, in one or more networks, such as private, community, public, or hybrid clouds as described herein, or a combination thereof. The cloud computing environment 450 is configured to offer infrastructure, platforms and/or software as services for which a cloud consumer does not need to maintain resources on a local computing device. It is understood that the types of computing devices shown in FIG. 4B are intended to be illustrative only and that computing nodes 455 and cloud computing environment 450 can communicate with any type of computerized device over any type of network and/or network addressable connection (e.g., using a web browser).

Referring now to FIG. 4C, a set of functional abstraction layers provided by cloud computing environment 450 (FIG. 4B) is shown. The components, layers, and functions shown in FIG. 4C are illustrative, and embodiments as described herein are not limited thereto. As depicted, the following layers and corresponding functions are provided:

A hardware and software layer 460 can comprise hardware and software components. Examples of hardware components include, for example: mainframes 461; servers 462; servers 463; blade servers 464; storage devices 465; and networks and networking components 466. In some embodiments, software components include network application server software 467 and database software 468.

Virtualization layer 470 provides an abstraction layer from which the following examples of virtual entities can be provided: virtual servers 471; virtual storage 472; virtual networks 473, including virtual private networks; virtual applications and operating systems 474; and virtual clients 475.

In one example, management layer 480 can provide the functions described below. Resource provisioning 481 provides dynamic procurement of computing resources and other resources that are utilized to perform tasks within the cloud computing environment. Metering and Pricing 482 provide cost tracking as resources are utilized within the cloud computing environment, and billing or invoicing for consumption of these resources. In one example, these resources can comprise application software licenses. Security provides identity verification for cloud consumers and tasks, as well as protection for data and other resources. User portal 483 provides access to the cloud computing environment for consumers and system administrators. Service level management 484 provides cloud computing resource allocation and management so that required service levels are met. Service Level Agreement (SLA) planning and fulfillment 485 provides pre-arrangement for, and procurement of, cloud computing resources for which a future requirement is anticipated in accordance with an SLA.

Workloads layer 490 provides examples of functionality for which the cloud computing environment can be utilized. Examples of workloads and functions that can be provided from this layer include mapping 491; input event processing 492, data stream processing 493; identity resolution 494; data analytics processing 495; and data delivery 496.

Figure 4D:
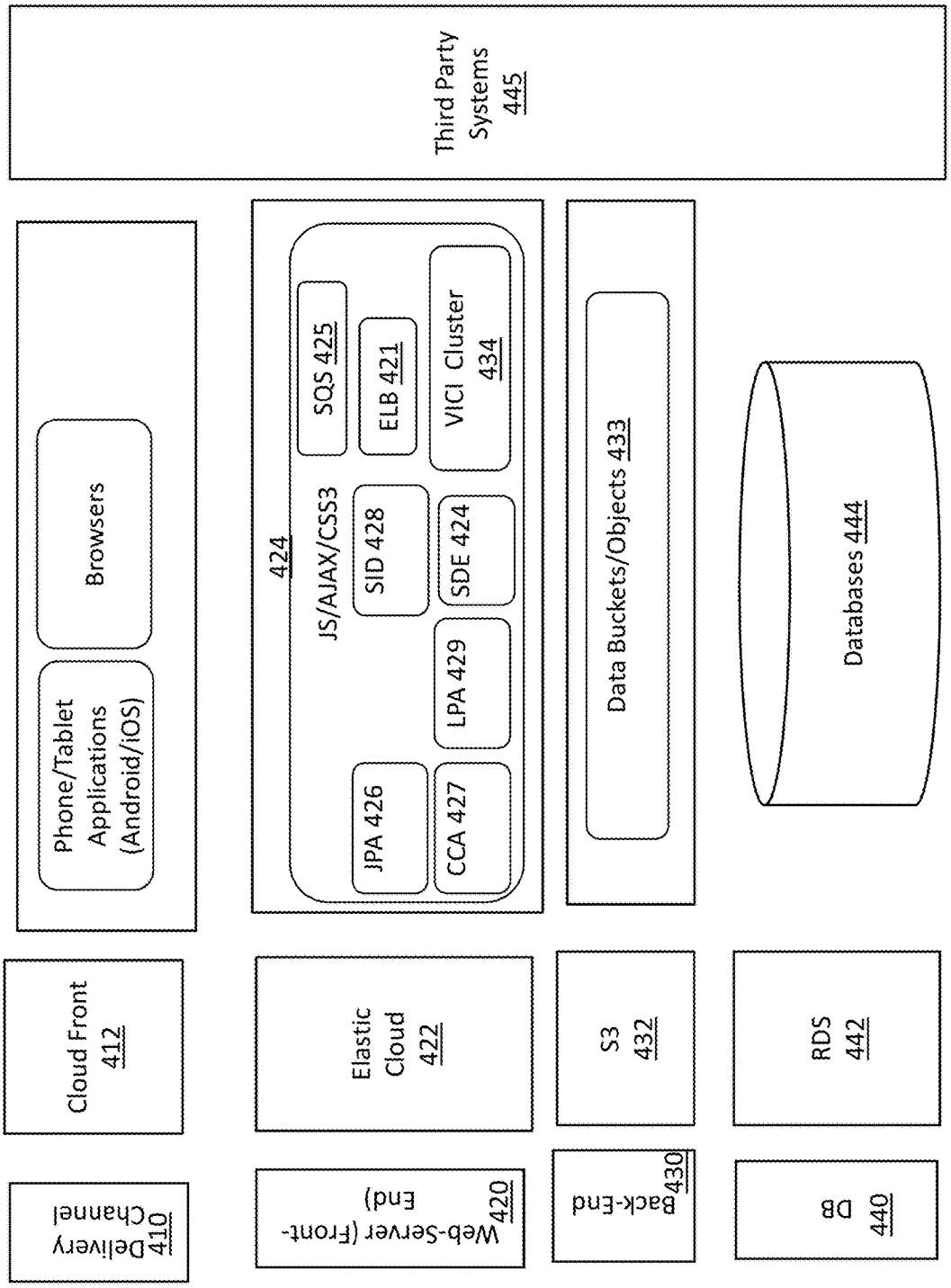

FIG. 4D shows the logical architecture for an embodiment. The system can be built on an exemplary platform, for example Amazon Web Service platform, although other platforms for supporting application content delivery, social networking and network infrastructure can be employed. As shown in FIG. 4D, a Delivery Channel tier 410 can be provided via a cloud front 412 to client computers as described herein. A front-end web server tier 420 can be built on an elastic cloud (EC2) architecture 422 and can provide front end interfaces, for example such as interfaces built on Angular JS 424 or other JS modules. The back-end tier 430 can be operatively connected to front end architecture tier 420 by web sockets, and can be built on an S3 architecture 432 and include data buckets and objects 433 for web-scale data storage and retrieval, and the databases layer 440 can include, for example, databases 444 on an Relational Database Structure 442 tier architecture. One or more third party systems 445 can be integrated or operatively connected to the architecture 450.

One of ordinary skill in the art will appreciate that the architecture of system is a non-limiting example that is illustrative of at least a portion of at least one of the various embodiments. As such, more or less components can be employed and/or arranged differently without departing from the scope of the innovations described herein. However, the system is sufficient for disclosing at least the innovations claimed herein.

Figure 4E:
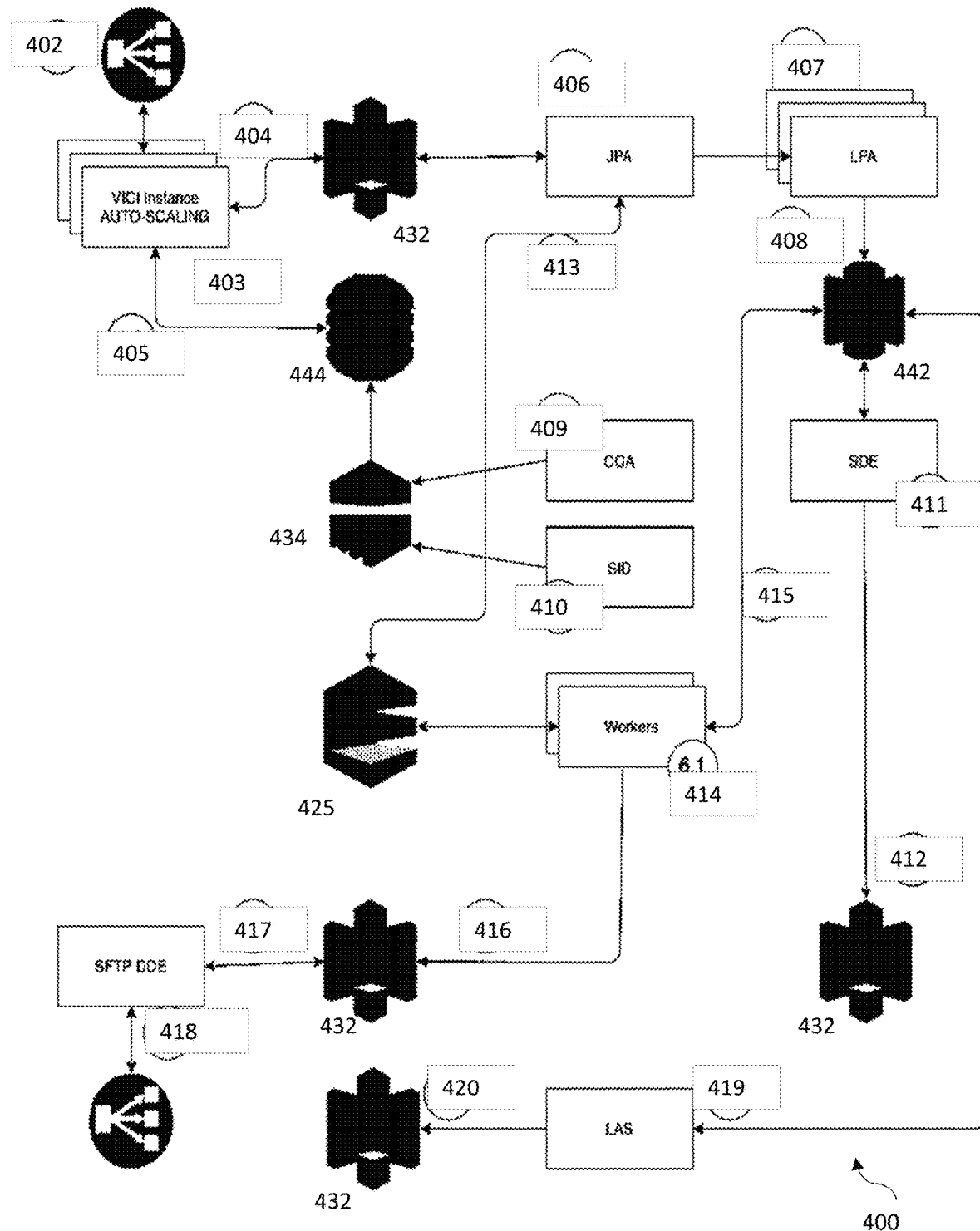

FIG. 4E represents a logical architecture flow 400 for a system for visitor intelligence analytics in a cloud computing environment in accordance with at least one of the various embodiments.

At block 402, requests enter the system through an Elastic Load Balancer (ELB) 421 and at block 403 are routed to a Visitor Intelligence Cloud Infrastructure VICI auto-scaling cluster application 434.

At block 404, the VICI application 434 polls the S3 server 432 for external configurations and pushes the Extract Transform Load (ETL) process and application 434 logs to the S3 server 432 on a regular cadence.

At block 405, the VICI application queries several tables within a Dynamo database 444 for IP, DUNS and cookie data as described herein.

A block 406, the ETL process begins with a Java Polling Agent JPA) 426. The JPA 426 polls S3 server 432 for ETL logs to consume. At block 407, the JPA 426 sends an SNS notification to a Lambda Processing Agent (LPA) 429 when new visitor intelligence files are ready to process. The LPA 429 runs Java code running on AWS Lambda, which transforms the data for load processing.

At block 408, the LPA 429 sends the transformed data to a data streaming application configured for data analytics, for example a Kinesis Firehose, which streams data to a cloud data warehouse 440, for example, a Redshift database 442 warehouse, which is configured to support queries petabytes of structured and semi-structured data across the data warehouse 442 and a data lake using standard SQ.

At block 409, a Customer Custom Attributes CCA 427 interface allows client users to supply first party data for VICI match responses. CCA rules are gathered from users and filtered for ingestion into a Dynamo database 444 through an EMR cluster 434, which is configured to be spun up and torn down on demand. At block 410, a Seed IPR and DUNS (SID) application 428 seeds new monthly IP to DUNS and DUNS lookup datasets into a Dynamo database 444 for VICI. This creates an EMR VICI cluster 434 on demand to efficiently seed the data.

At block 411, a Sigmoid Data Extract (SDE) script 424 extracts hourly VI data to send to a 3rd party interface for interactive reporting. In particular, at block 412, the data is encrypted via PGP and pushed to an S3 server 432 data bucket 433 for consumption.

At block 413, the JPA application publishes Simple Queue Service (SQS) 425 messages for subscribers. These messages contain metadata for workers to perform daily data extracts for customer client users. At block 414, workers poll the SQS 425 for jobs to take action on. Then, at block 415, workers then receive instructions for SQL unloads from the Redshift database 442 for customer client users that have their daily data exports enabled.

At block 416, the data is then unloaded from the database 442 to the S3 server 432. At block 417, an SFTP server has an S3 server 432 mount that includes the daily unload data for client users. At block 418 client users can use an ELB interface to connect to the SFTP host to get their daily files.

At block 419 a Log Aggregator Agent LAS host has shell scripts that run on a scheduling script, for example a Cron, to perform custom unloads from the Redshift database 442 for internal teams. At block 420, unloads are then stored in the S3 server 432 for consumption.

Although this disclosure describes embodiments on a cloud computing platform, implementation of embodiments as described herein are not limited to a cloud computing environment.

Illustrative Network Computer

Figure 5:
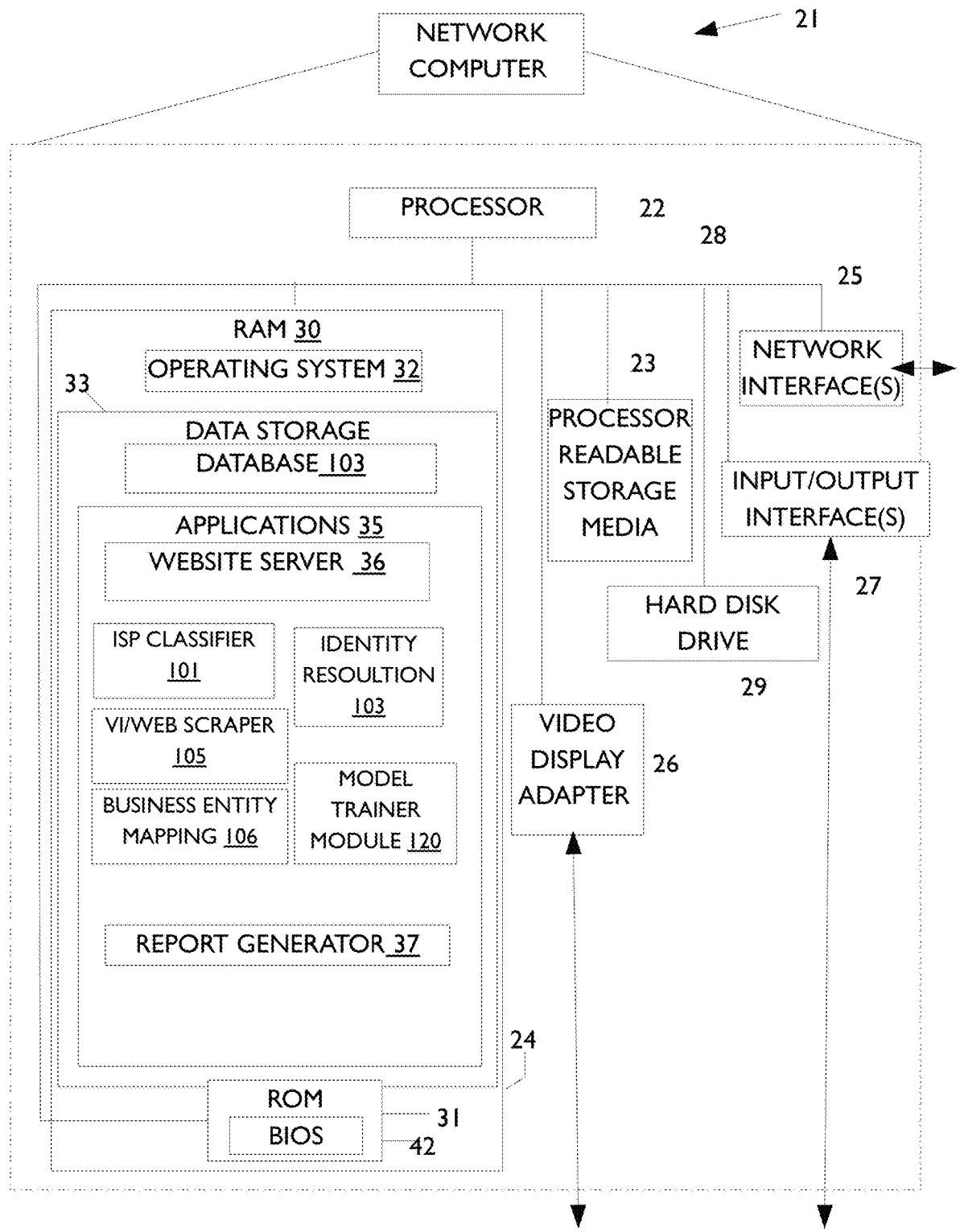
FIG. 5 shows an embodiment of a network computer that can be included in a system such as that shown in FIG. 3.

FIG. 5 shows one embodiment of a network computer 21 according to one embodiment of the present disclosure. Network computer 21 can include many more or less components than those shown. The components shown, however, are sufficient to disclose an illustrative embodiment for practicing the invention. Network computer 21 can be configured to operate as a server, client, peer, a host, or any other computer. Network computer 21 can represent, for example Data Analytics Server Computer 10 and/or Business Entity Analytics Server Computer 20 of FIG. 4, and/or other network computers.

Network computer 21 includes processor 22, processor readable storage media 23, network interface unit 25, an input/output interface 27, hard disk drive 29, video display adapter 26, and memory 24, all in communication with each other via bus 28. In some embodiments, processor 22 can include one or more central processing units.

As illustrated in FIG. 5, network computer 21 also can communicate with the Internet, or some other communications network, via network interface unit 25, which is constructed for use with various communication protocols including the TCP/IP protocol. Network interface unit 25 is sometimes known as a transceiver, transceiving device, or network interface card (NIC).

Network computer 21 also comprises input/output interface 27 for communicating with external devices, such as a keyboard, or other input or output devices not shown in FIG. 5. Input/output interface 27 can utilize one or more communication technologies, such as USB, infrared, Bluetooth™, or the like.

Memory 24 generally includes a Random Access Memory (RAM) 54, a Read Only Memory (ROM) 55 and one or more permanent mass storage devices, such as hard disk drive 29, tape drive, optical drive, and/or floppy disk drive. Memory 24 stores operating system 32 for controlling the operation of network computer 21. Any general-purpose operating system can be employed. Basic input/output system (BIOS) 42 is also provided for controlling the low-level operation of network computer 21.

Although illustrated separately, memory 24 can include processor readable storage media 23. Processor readable storage media 23 may be referred to and/or include computer readable media, computer readable storage media, and/or processor readable storage device. Processor readable storage media 23 can include volatile, non-volatile, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media that can be used to store the desired information and which can be accessed by a computer.

Memory 24 further includes one or more data storage 33, which can be utilized by network computer 21 to store, among other things, applications 35 and/or other data. For example, data storage 33 can also be employed to store information that describes various capabilities of network computer 21. The information can then be provided to another computer based on any of a variety of events, including being sent as part of a header during a communication, sent upon request, or the like. Data storage 33 can also be employed to store messages, web page content, or the like. At least a portion of the information can also be stored on another component of network computer 21, including, but not limited to processor readable storage media 23, hard disk drive 29, or other computer readable storage medias (not shown) within network computer 21.

Data storage 33 can include a database, text, spreadsheet, folder, file, or the like, that may be configured to maintain and store user account identifiers, user profiles, email addresses, IM addresses, and/or other network addresses; or the like.

In at least one of the various embodiments, data storage 33 can include databases, for example training database(s) 108, mapped/core data database 107, business entity database 104a, ISP rules database 118, ISP whitelist 116, ISP blacklist 114, and other databases that can contain information determined from web analysis and network activity metrics as described herein, for example, unique visits (date-time stamps, IP address) and unique visitors (different cookies, different IP addresses).

Data storage 33 can further include program code, data, algorithms, and the like, for use by a processor, such as processor 22 to execute and perform actions. In one embodiment, at least some of data storage 33 might also be stored on another component of network computer 21, including, but not limited to processor-readable storage media 23, hard disk drive 29, or the like.

Applications 35 can include computer executable instructions, which may be loaded into mass memory 24 and run on operating system 32. Examples of application programs can include transcoders, schedulers, calendars, database programs, word processing programs, Hypertext Transfer Protocol (HTTP) programs, customizable user interface programs, IPsec applications, encryption programs, security programs, SMS message servers, IM message servers, email servers, account managers, and so forth. Applications 35 can also include website server 36, ISP Classifier 101, a Visitor Intelligence or Web Scraper Module 105 for web traffic data content 102, Business Entity Identity Resolution Module 103, Business Entity Mapping Module 106, Model Trainer Module 120, and Report Generator 37.

Website server 36 can represent any of a variety of information and services that are configured to provide content, including messages, over a network to another computer. Thus, website server 36 can include, for example, a web server, a File Transfer Protocol (FTP) server, a database server, a content server, or the like. Website server 36 can provide the content including messages over the network using any of a variety of formats including, but not limited to WAP, HDML, WML, SGML, HTML, XML, Compact HTML (cHTML), Extensible HTML (xHTML), or the like.

Website server 36, ISP Classifier 101, a Visitor Intelligence or Web Scraper Module 105 for web traffic data content 102, Business Entity Identity Resolution Module 103, Business Entity Mapping Module 106, Model Trainer Module 120, and Report Generator 37 can be operative on or hosted and operative on Data Analytics Server Computer 10 and/or Business Entity Analytics Server Computer 20 of FIG. 4. Report Generator 37 can employ processes, or parts of processes, similar to those described in conjunction with FIGS. 1-2 to perform at least some of its actions.

Report Generator 37 can be arranged and configured to determine and/or generate reports based on the user filters and controls similar to those described above with reference to the user interface 30 controls. Also, Report Generator 37 can be configured to output a tailored report, either in the form of publishing software application which prepares and outputs a listing in a convenient-to-read form, or the same information output in a format suitable for automatic input and processing by another software product, for example plain text for a publishing program such as LaTeX. In at least one of the various embodiments, Report Generator 37 can be operative on or hosted and operative on Data Analytics Server Computer 10 and/or Business Entity Analytics Server Computer 20 of FIG. 4. Report Generator 37 can employ processes, or parts of processes, similar to those described in conjunction with FIGS. 1-3 to perform at least some of its actions. Report Generator can be employed to output reports for the interfaces as shown in FIG. 7.

Illustrative Client Computer

Figure 6:
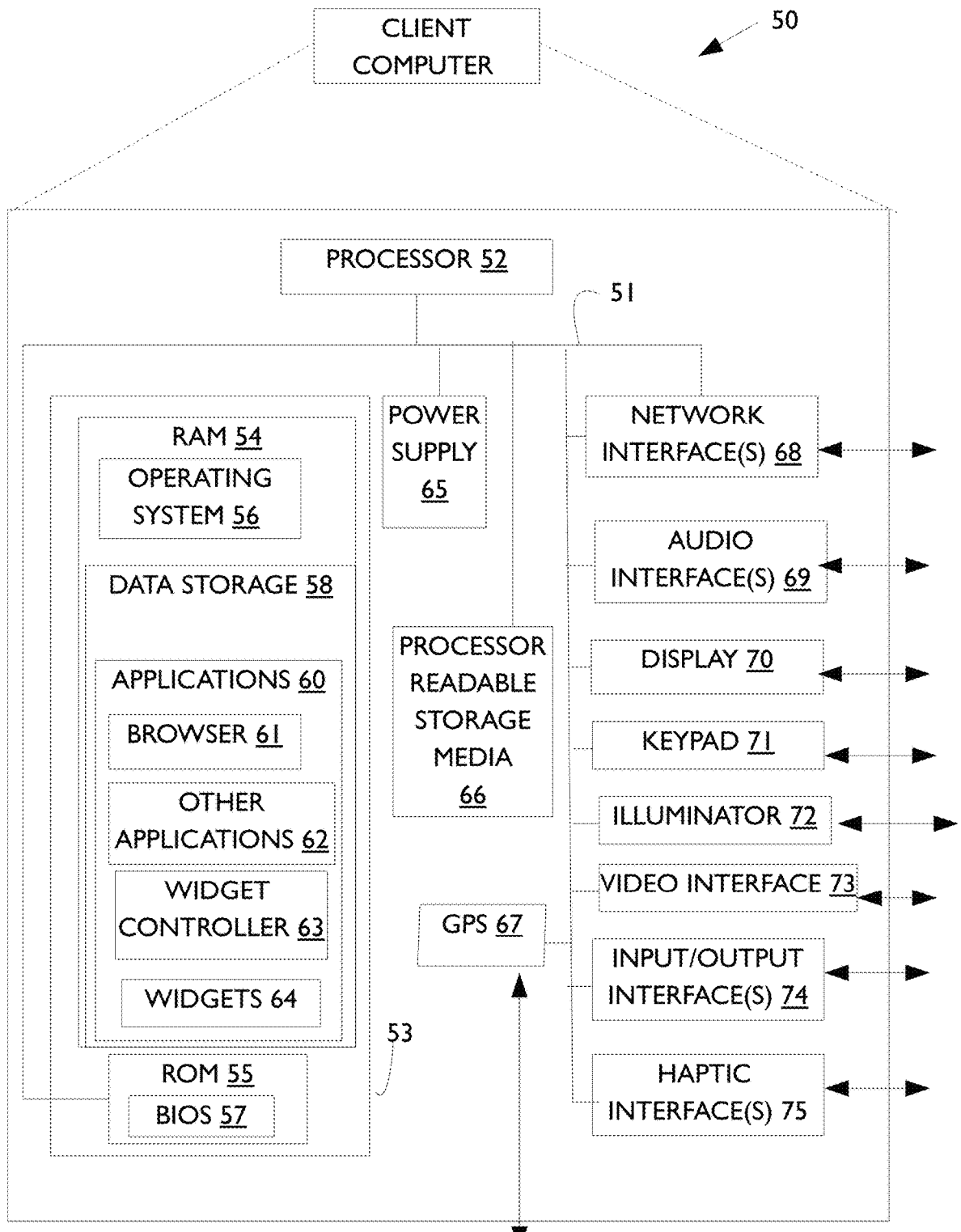
FIG. 6 shows an embodiment of a client computer that can be included in a system such as that shown in FIG. 3.

Referring to FIG. 6, Client Computer 50 can include many more or less components than those shown in FIG. 4. However, the components shown are sufficient to disclose an illustrative embodiment for practicing the innovations described herein.

Client Computer 50 can represent, for example, one embodiment of at least one of Client Computers 12-16 of FIG. 4.

As shown in the figure, Client Computer 50 includes a processor 52 in communication with a mass memory 24 via a bus 51. In some embodiments, processor 52 includes one or more central processing units (CPU). Client Computer 50 also includes a power supply 65, one or more network interfaces 68, an audio interface 69, a display 70, a keypad 71, an illuminator 72, a video interface 73, an input/output interface 74, a haptic interface 75, and a global positioning system (GPS) receiver 67.

Power supply 65 provides power to Client Computer 50. A rechargeable or non-rechargeable battery can be used to provide power. The power can also be provided by an external power source, such as an alternating current (AC) adapter or a powered docking cradle that supplements and/or recharges a battery.

Client Computer 50 may optionally communicate with a base station (not shown), or directly with another computer. Network interface 68 includes circuitry for coupling Client Computer 50 to one or more networks, and is constructed for use with one or more communication protocols and technologies including, but not limited to, GSM, CDMA, TDMA, GPRS, EDGE, WCDMA, HSDPA, LTE, user datagram protocol (UDP), transmission control protocol/Internet protocol (TCP/IP), short message service (SMS), WAP, ultra wide band (UWB), IEEE 802.16 Worldwide Interoperability for Microwave Access (WiMax), session initiated protocol/real-time transport protocol (SIP/RTP), or any of a variety of other wireless communication protocols. Network interface 68 is sometimes known as a transceiver, transceiving device, or network interface card (NIC).

Audio interface 69 is arranged to produce and receive audio signals such as the sound of a human voice. For example, audio interface 69 can be coupled to a speaker and microphone (not shown) to enable telecommunication with others and/or generate an audio acknowledgement for some action.

Display 70 can be a liquid crystal display (LCD), gas plasma, light emitting diode (LED), organic LED, or any other type of display used with a computer. Display 70 can also include a touch sensitive screen arranged to receive input from an object such as a stylus or a digit from a human hand.

Keypad 71 can comprise any input device arranged to receive input from a user. For example, keypad 71 can include a push button numeric dial, or a keyboard. Keypad 71 can also include command buttons that are associated with selecting and sending images. Illuminator 72 can provide a status indication and/or provide light. Illuminator 72 can remain active for specific periods of time or in response to events. For example, when illuminator 72 is active, it can backlight the buttons on keypad 71 and stay on while the Client Computer is powered. Also, illuminator 72 can backlight these buttons in various patterns when particular actions are performed, such as dialing another client computer. Illuminator 72 can also cause light sources positioned in a transparent or translucent case of the client computer to illuminate in response to actions.

Video interface 73 is arranged to capture video images, such as a still photo, a video segment, an infrared video, or the like. For example, video interface 73 can be coupled to a digital video camera, a web-camera, or the like. Video interface 73 can comprise a lens, an image sensor, and other electronics. Image sensors may include a complementary metal-oxide-semiconductor (CMOS) integrated circuit, charge coupled device (CCD), or any other integrated circuit for sensing light.

Client Computer 50 also comprises input/output interface 74 for communicating with external devices, such as a headset, or other input or output devices not shown in FIG. 4. Input/output interface 74 can utilize one or more communication technologies, such as USB, infrared, Bluetooth™, or the like.

Haptic interface 75 is arranged to provide tactile feedback to a user of the Client Computer 50. For example, the haptic interface 75 can be employed to vibrate Client Computer 50 in a particular way when another user of a computing computer is calling. In some embodiments, haptic interface 75 is optional.

Client Computer 50 can also include GPS transceiver 67 to determine the physical coordinates of Client Computer 50 on the surface of the Earth. GPS transceiver 67, in some embodiments, is optional. GPS transceiver 67 typically outputs a location as latitude and longitude values. However, GPS transceiver 67 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of Client Computer 50 on the surface of the Earth. It is understood that under different conditions, GPS transceiver 67 can determine a physical location within millimeters for client computer 50. In other cases, the determined physical location may be less precise, such as within a meter or significantly greater distances. In one embodiment, however, Client Computer 50 can, through other components, provide other information that can be employed to determine a physical location of the computer, including for example, a Media Access Control (MAC) address, IP address, or the like.

Mass memory 24 includes a Random Access Memory (RAM) 54, a Read-only Memory (ROM) 55, and other storage means. Mass memory 24 illustrates an example of computer readable storage media (devices) for storage of information such as computer readable instructions, data structures, program modules or other data. Mass memory 24 stores a basic input/output system (BIOS) 57 for controlling low level operation of Client Computer 50. The mass memory 24 also stores an operating system 56 for controlling the operation of Client Computer 50. It will be appreciated that this component can include a general-purpose operating system such as a version of UNIX, or LINUX™, or a specialized client communication operating system such as Microsoft Corporation's Windows™ OS, Apple Corporation's iOS™, Google Corporation's Android™ or the Symbian® operating system. The operating system can include, or interface with a Java virtual machine module that enables control of hardware components and/or operating system operations via Java application programs.

Mass memory 24 further includes one or more data storages 58 that can be utilized by Client Computer 50 to store, among other things, applications 60 and/or other data. For example, data storage 58 can also be employed to store information that describes various capabilities of Client Computer 50. The information can then be provided to another computer based on any of a variety of events, including being sent as part of a header during a communication, sent upon request, or the like. Data storage 58 can also be employed to store social networking information including address books, buddy lists, aliases, user profile information, or the like. Further, data storage 58 can also store message, web page content, or any of a variety of user generated content. At least a portion of the information can also be stored on another component of Client Computer 50, including, but not limited to processor readable storage media 66, a disk drive or other computer readable storage devices (not shown) in Client Computer 50.

Processor readable storage media 66 can include volatile, non-volatile, removable, and non-removable media implemented in any method or technology for storage of information, such as computer- or processor-readable instructions, data structures, program modules, or other data. Examples of computer readable storage media include RAM, ROM, Electrically Erasable Programmable Read-only Memory (EEPROM), flash memory or other memory technology, Compact Disc Read-only Memory (CD-ROM), digital versatile disks (DVD) or other optical storage, magnetic cassettes, magnetic tape, magnetic disk storage or other magnetic storage devices, or any other physical medium that can be used to store the desired information and which can be accessed by a computer. Processor readable storage media 66 is also referred to herein as computer readable storage media and/or computer readable storage device.

Applications 60 can include computer executable instructions which, when executed by Client Computer 50, transmit, receive, and/or otherwise process network data. Network data includes, but is not limited to, messages (e.g. SMS, Multimedia Message Service (MMS), instant message (IM), email, and/or other messages), audio, video, and enable telecommunication with another user of another Client Computer 50.

Applications 60 can include, for example, browser 61, and other applications 62. Other applications 62 include, but are not limited to, calendars, search programs, email clients, IM applications, SMS applications, voice over Internet Protocol (VOIP) applications, contact managers, task managers, transcoders, database programs, word processing programs, security applications, spreadsheet programs, games, search programs, and so forth.

Browser 61 can include virtually any application configured to receive and display graphics, text, multimedia, messages, and the like, employing virtually any web-based language. In one embodiment, the browser application employs HDML, WML, WMLScript, JavaScript, JSON, SGML, HTML, XML, and the like, to display and send a message. However, any of a variety of other web-based programming languages can be employed. In one embodiment, browser 61 enables a user of Client Computer 50 to communicate and interface with another network computer, such as Data Analytics Server Computer 10, a Business Entity Analytics Server Computer 20, Web Traffic Object Sources 102n and Other Data Sources 112n of FIG. 4 such that a user can operate a user interface 30 as described herein.

Applications 60 can also include Widget Controller 63 and one or more Widgets 64. Widgets 64 can be collections of content provided to the Client Computer by Data Analytics Server Computer 10, a Business Entity Analytics Server Computer 20, Web Traffic Object Sources 102n and Other Data Sources 112n. Data Analytics Server Computer 10, a Business Entity Analytics Server Computer 20, Web Traffic Object Sources 102n and Other Data Sources 112n of FIG. 4. Widget Controller 63 and Widgets 64 can run as native Client Computer applications, or they can run in Browser 61 as web browser-based applications. Also, Widget Controller 63 and Widgets 64 can be arranged to run as native applications or web browser applications, or combination thereof. In one embodiment, browser 61 employs Widget Controller 63 and Widgets 64 to enable a user of Client Computer 50 to communicate and interface with another network computer, such as Data Analytics Server Computer 10, a Business Entity Analytics Server Computer 20, Web Traffic Object Sources 102n and Other Data Sources 112n of FIG. 4 such that a user can operate a user interface 30 as described herein.

Illustrative Graphical User Interface

Referring to FIG. 7, in at least one of the various embodiments, user interfaces other than user interface 30 described below, can be employed without departing from the spirit and/or scope of the present disclosure. Such user interfaces can have more or fewer user interface elements that are arranged in various ways. In some embodiments, user interfaces can be generated using web pages, mobile applications, emails, PDF documents, text messages, or the like.

The user interface unit 30 is now described in more detail. As shown in FIG. 7, the interface 30 can be configured for, inter alia, VI reporting for ISP identification.

In an embodiment, the system can be configured to provide a daily log-based report that shows audiences based on the business identifier (DUNS) that are demonstrating non-human based traffic and in-turn can be used for further email targeting, CRM and retargeting. In an embodiment, the system can be configured to provide intelligence to understand the performance and ROI of the existing campaign that client has already launched by identifying non-human audiences under their campaigns. Also, the information can be used to effectively understand which of products or services an individual is interested in on a website, and use those insights to determine the content of retargeted ads. Further, the system can be configured to identify suspicious non-human activity on the website that may indicate malicious or undesirable web traffic.

The user interface 30 has been described using the example of a dashboard suitable for a personal computer, as this is an amenable form for the purpose of explanation. Similar graphical user interfaces with a dashboard format can also be provided as a mobile app, e.g. for Android or iPhone operating systems, where the term "mobile app" refers primarily to a module of applications software capable of running on a smart phone or tablet device or other client computer. Other types of user interfaces can also be provided. An alternative user interface type is an application programming interface (API), which is the type of user interface which would be suitable for developers who wish to integrate the system as described herein with a third-party software application, e.g. to incorporate outputs in a flexible manner suited to the third party applications software which is being integrated. Another user interface type would be a report writing software application, which, based on user filters and controls similar to those described above with reference to the dashboard, will output a tailored report.

The operation of certain aspects of the present disclosure have been described with respect to flowchart illustrations. In at least one of various embodiments, processes described in conjunction with FIGS. 1 to 7, can be implemented by and/or executed on a single network computer. In other embodiments, these processes or portions of these processes can be implemented by and/or executed on a plurality of network computers. Likewise, in at least one of the various embodiments, processes or portions thereof, can operate on one or more client computers, such as client computer 50. However, embodiments are not so limited, and various combinations of network computers, client computers, virtual machines, or the like can be used. Further, in at least one of the various embodiments, the processes described in conjunction with the flowchart illustrations can be operative in systems with logical architectures, such as those described in herein.

It will be understood that each block of the flowchart illustrations described herein, and combinations of blocks in the flowchart illustrations, can be implemented by computer program instructions. These program instructions can be provided to a processor to produce a machine, such that the instructions, which execute on the processor, create means for implementing the actions specified in the flowchart block or blocks. The computer program instructions can be executed by a processor to cause a series of operational steps to be performed by the processor to produce a computer-implemented process such that the instructions, which execute on the processor to provide steps for implementing the actions specified in the flowchart block or blocks. The computer program instructions can also cause at least some of the operational steps shown in the blocks of the flowchart to be performed in parallel. Moreover, some of the steps can also be performed across more than one processor, such as might arise in a multi-processor computer system or even a group of multiple computer systems. In addition, one or more blocks or combinations of blocks in the flowchart illustration can also be performed concurrently with other blocks or combinations of blocks, or even in a different sequence than illustrated without departing from the scope or spirit of the present disclosure.

Accordingly, blocks of the flowchart illustrations support combinations for performing the specified actions, combinations of steps for performing the specified actions and program instruction means for performing the specified actions. It will also be understood that each block of the flowchart illustrations, and combinations of blocks in the flowchart illustrations, can be implemented by special purpose hardware-based systems, which perform the specified actions or steps, or combinations of special purpose hardware and computer instructions. The foregoing examples should not be construed as limiting and/or exhaustive, but rather, as illustrative use cases to show an implementation of at least one of the various embodiments of the present disclosure.

What is claimed is:

1. A method being performed by a computer system that comprises one or more processors and a computer-readable storage medium encoded with instructions executable by at least one of the processors and operatively coupled to at least one of the processors, the method comprising:
obtaining website data traffic content for a website including a plurality of IP addresses for visitors visiting the website;
mapping the IP addresses to a plurality of business entity identifiers to identify a plurality of business entities associated with the website data traffic data;
obtaining attribute data for each business entity associated with each of the plurality of business entity identifiers to identify business attributes associated with each of the business entities mapped to the each of the IP addresses;
generating a training data set from the website data traffic content and the attribute data for training an Internet Service Provider (ISP) classifier to identify ISPs associated with the mapped website traffic data, the training data set being generated from website data traffic content having IP addresses successfully matched to the business entities identifiers, and the attribute data comprises a feature set for a model comprising features from firmographic data for the attribute data and the web traffic data comprising: industry code, unique visitors, visit count, employee count, revenue, and a customer data;
wherein the web traffic data comprises, per IP address, a count of visits, unique visitors, and index customer count that accessed the website within a time window;
wherein the time window comprise an interval of: ingesting the web traffic data,
mapping the web traffic data,
running the classifier to identify ISP and non-ISP web traffic; and
configuring the continuous maintenance of the model by aggregate tracking and machine intelligence;
generating a model for training the ISP classifier,
wherein the model comprises a supervised classification,
wherein the supervised classification model is a gradient boosting classifier; and
wherein the gradient boosting classifier training comprises iterating the gradient booster for about 1000 iterations,
training the model on the training data set;
determining if the trained model accurately identifies ISPs; and
if the model is accurate, applying the trained ISP classifier to a database of website content data; and
identifying website traffic for the website attributable to ISPs.

2. The method of claim 1, further comprising:
obtaining a match acceptance rate of IP addresses from the website traffic data mapped to a plurality of the business entities identifiers;
generating the training data set from the IP addresses from the website traffic data matched to the business entities identifiers.

3. The method of claim 2, further comprising:
replacing the IP addresses from the website traffic data mapped to the business entities identifiers with previously identified IP addresses from the website traffic data that were previously mapped or matched to other business entities.

4. The method of claim 1, further comprising:
generating the model for training the ISP classifier; and
if the model is accurate, applying the trained model as the ISP classifier to the database of website content data.

5. The method of claim 4, further comprising:
applying the trained ISP classifier to a database of IP addresses mapped to business entity identifications from a business entity firmographic database that does not include website traffic visit information and website traffic visitor information.

6. The method of claim 1, wherein obtaining website data traffic content including IP addresses data for a website further comprises:
placing a tracking code object on a website to be tracked;
generating a log file identifying all IPs and cookies associated with the IPs tracked by the tracking code.

7. The method of claim 1, wherein the time window comprises:
a time window selected from the group consisting of: a weekly time interval, a biweekly interval, a monthly interval, a bi-monthly interval, and a quarterly interval.

8. The method of claim 7, wherein the time window comprises: the monthly interval.

9. The method of claim 1, wherein the revenue data comprises annual sales.

10. The method of claim 1, wherein the industry code comprises an SIC code, an NAICS code, or both.

11. The method of claim 1, wherein the gradient boosting classifier model $\{F\}$ that predict values of the form $y=F(x)$ by minimizes g the mean squared error.

12. The method of claim 1, wherein the gradient boosting classifier comprises:
at each stage m of gradient boosting ($1<=m<=M$) for model Fm predicting mean y in the training set, the gradient boosting algorithm adds an estimator h [$Fm+1(x)=Fm(x)+h(x)$], where $Fm+1(x)=Fm(x)+h(x)=y$, wherein the gradient boosting fits h to the residual $y-Fm(x)$.

13. A computer program stored on a computer readable medium and loadable into the internal memory of a digital computer, comprising software code portions, when said program is run on a computer, for performing the method of claim 1.

14. The method of claim 1, wherein the gradient boosting classifier model substantially fits the data.

15. The method of claim 14, wherein the gradient boosting classifier model fits the data and produces substantially accurate ISP identification than other classifier models.

16. The method of claim 1, wherein the gradient boosting classifier further comprises processing on real web traffic data and results impact directly, while employing automated notification gates at stages.

17. The method of claim 16, wherein the gradient boosting classifier is configured to provide automated notifications if the confusion matrix or output results are not accurate.

18. The method of claim 1, wherein the gradient boosting classifier further comprises a monthly interval run of the classifier producing output classification output.

19. The method of claim 18, wherein the gradient boosting classifier further comprises a manual review and consolidation of records.

20. The method of claim 19, wherein the gradient boosting classifier further comprises a revised dataset, appended to a next monthly interval cycle of the model run and update the training of the model using machine intelligence.

21. A computer system comprising:
a network computer, including:
a transceiver for communicating over the network;
   a memory for storing at least instructions and a word database; and
   a processor device that is operative to execute instructions that enable actions, comprising:
obtaining website data traffic content including IP address data for a website;
mapping the IP address data for the website to at least one business entity identifier to identify at least one business entity associated with the website data traffic data;
obtaining attribute data for each business entity associated with the at least one business entity identifier to identify business attributes associated with the at least one business entity mapped to the IP address data;
generating a training data set from the website data traffic content and the attribute data for training an Internet Service Provider (ISP) classifier to identify ISPs associated with the mapped website traffic data, the training data set being generated from website data traffic content having IP addresses successfully matched to the business entities identifiers, and the attribute data comprises a feature set for a model comprising features from firmographic data for the attribute data and the web traffic data comprising: industry code, unique visitors, visit count, employee count, revenue, and a customer data;
wherein the web traffic data comprises, per IP address, a count of visits, unique visitors, and index customer count that accessed the website within a time window;
wherein the time window comprise an interval of: ingesting the web traffic data,
   mapping the web traffic data,
   running the classifier to identify ISP and non-ISP web traffic; and
   configuring the continuous maintenance of the model by aggregate tracking and machine intelligence;
generating a model for training the ISP classifier,
wherein the model comprises a supervised classification;
wherein the supervised classification model is a gradient boosting classifier; and
wherein the gradient boosting classifier training comprises iterating the gradient booster for about 1000 iterations,
training the model on the training data set;
determining if the trained model accurately identifies ISPs; and
if the model is accurate, applying the trained ISP classifier to a database of website content data; and
identifying website traffic for the website attributable to ISPs.

* * * * *